United States Patent [19]
Suzuki et al.

[11] Patent Number: 5,608,565
[45] Date of Patent: Mar. 4, 1997

[54] BIDIRECTIONAL OPTICAL TRANSMISSION SYSTEM

[75] Inventors: Yasuhiro Suzuki; Kiyomi Kumozaki; Ryuichi Watanabe, all of Kanagawa, Japan

[73] Assignee: Nippon Telegraph And Telephone Corporation, Tokyo, Japan

[21] Appl. No.: 489,675

[22] Filed: Jun. 13, 1995

[30] Foreign Application Priority Data

Jun. 14, 1994 [JP] Japan .................................. 6-132112
Jun. 17, 1994 [JP] Japan .................................. 6-135772
Aug. 3, 1994 [JP] Japan .................................. 6-182625

[51] Int. Cl.$^6$ .................................................. H04B 10/207
[52] U.S. Cl. ........................... 359/237; 359/126; 359/154
[58] Field of Search .................................. 359/126, 154, 359/164, 171, 237

[56] References Cited

U.S. PATENT DOCUMENTS

| | | | |
|---|---|---|---|
| 4,642,804 | 2/1987 | Personick | 370/3 |
| 4,658,394 | 4/1987 | Cheng et al. | 370/3 |
| 4,910,726 | 3/1990 | Stanley | 370/3 |
| 5,440,415 | 8/1995 | Mekawi et al. | 359/126 |

FOREIGN PATENT DOCUMENTS

| | | |
|---|---|---|
| 62-155632 | 7/1987 | Japan . |
| 63-169836 | 7/1988 | Japan . |
| 1-221029 | 9/1989 | Japan . |
| 2-25126 | 1/1990 | Japan . |
| 4-139924 | 5/1992 | Japan . |
| 5-235873 | 9/1993 | Japan . |
| WO87/06084 | 10/1987 | WIPO . |

OTHER PUBLICATIONS

"Ultra–High–Splitting–Ratio Subscriber Loops for Small Capacity Services", Maekawa et al, *Technical Report of IEICE*, OCS94–64, OPE94–87 (1994–11), pp. 19–24.

"Fiber–Optic Subsciber System Based on Passive Optical Network Architecture," 8297 Hitachi Review, 43 (1994) Apr., No. 2, Tokyo, Japan, pp. 53–58.

*Primary Examiner*—Mark Hellner
*Attorney, Agent, or Firm*—Nikaido Marmelstein Murray & Oram LLP

[57] ABSTRACT

In a bidirectional optical transmission system between an optical subscriber unit (10; OSU) in a central office and a plurality of optical network units (20A$_i$; ONU) in customer premises each coupled with the subscriber unit (10) through an optical fiber cable, the optical subscriber unit (10) has a laser oscillator (11), a device (12) for splitting an output beam of the laser oscillator into n number of beams, a plurality of optical modulators (13-1 through 13-n), coupled with each of the n number of beams, for modulating a related optical beam with a transmission signal S for a respective optical network unit, a plurality of optical detectors (14-1 through 14-n) coupled with each of the optical network units to provide a receive signal R by converting the receive optical signal into electrical form. Each pair of one of the optical modulators and one of the optical detectors are coupled with a respective optical network unit through an optical fiber cable (5-1, 5-2). Each of the optical network units (20-1 through 20-n) has a device for receiving the optical signal from the ONU, to convert the receive optical beam into the electrical signal and for transmitting the optical signal modulated with the transmission signal to the ONU.

17 Claims, 34 Drawing Sheets

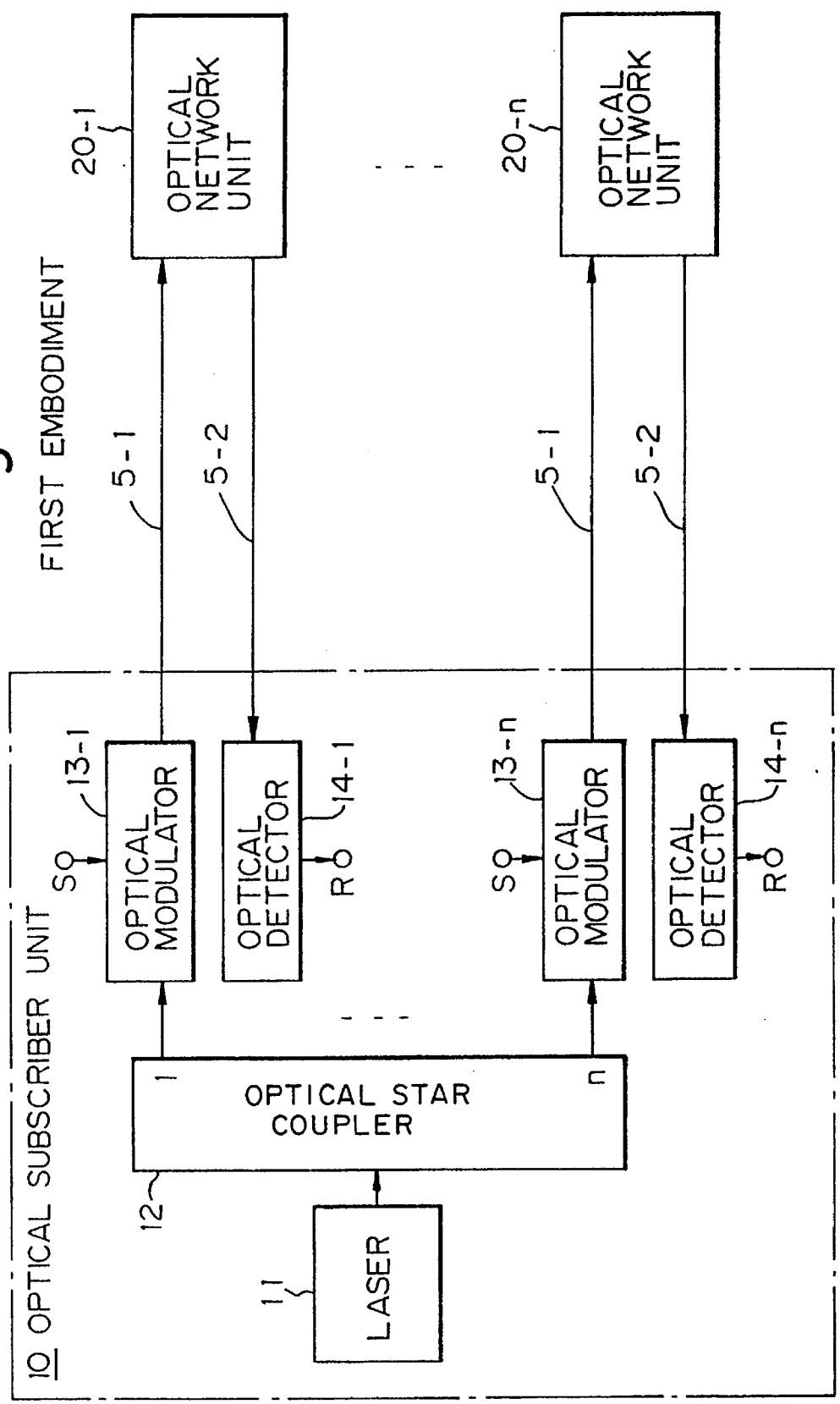

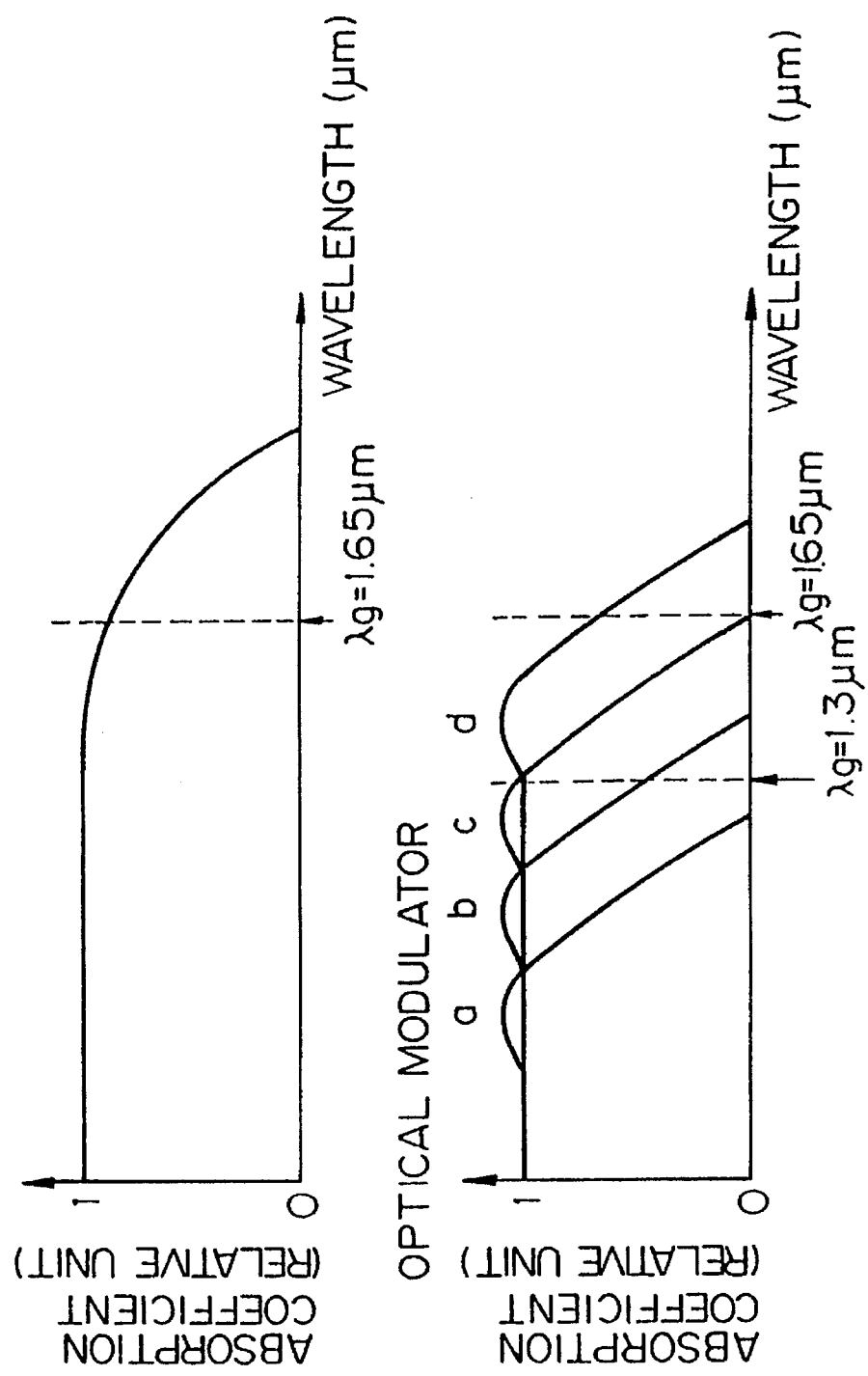

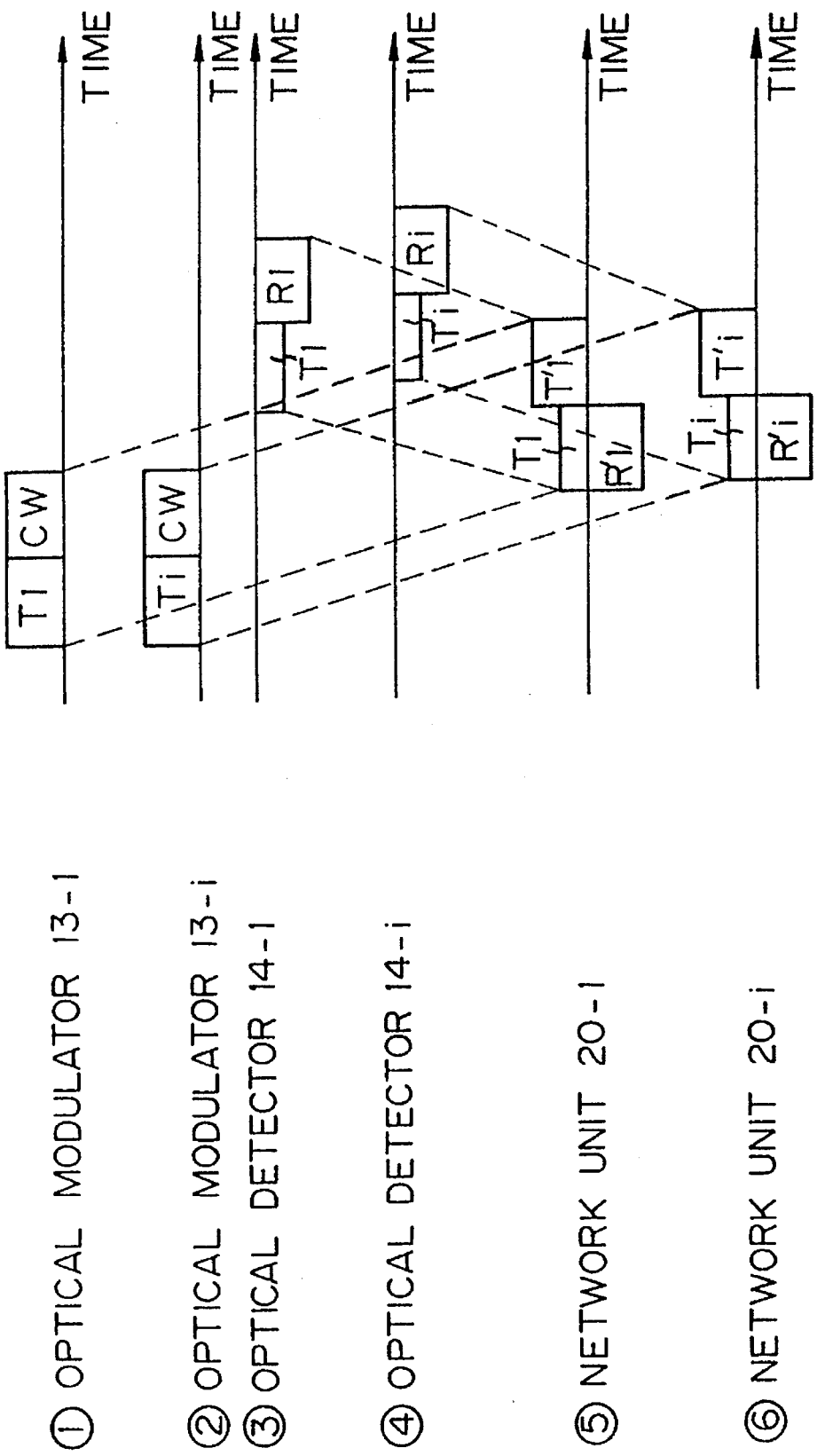

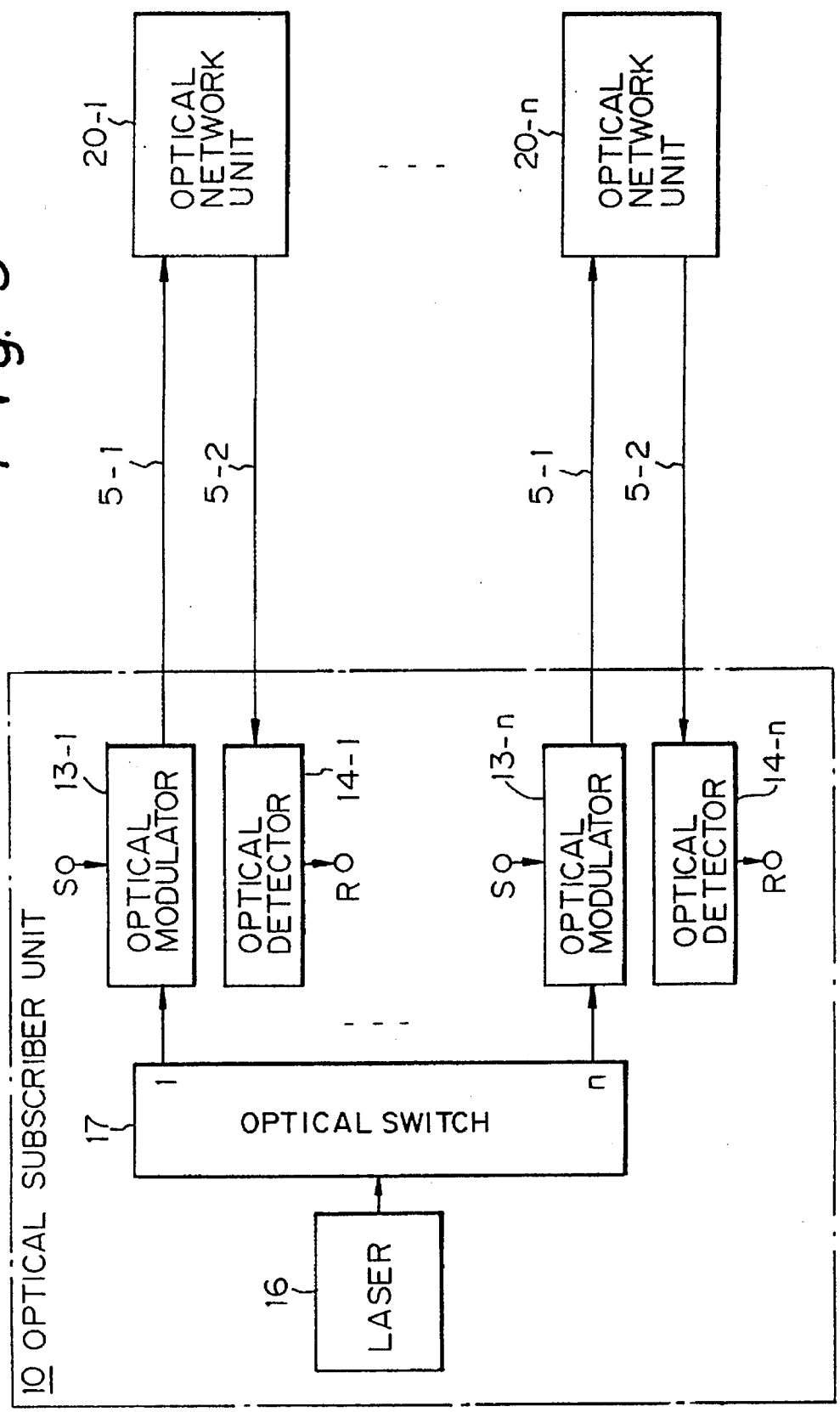

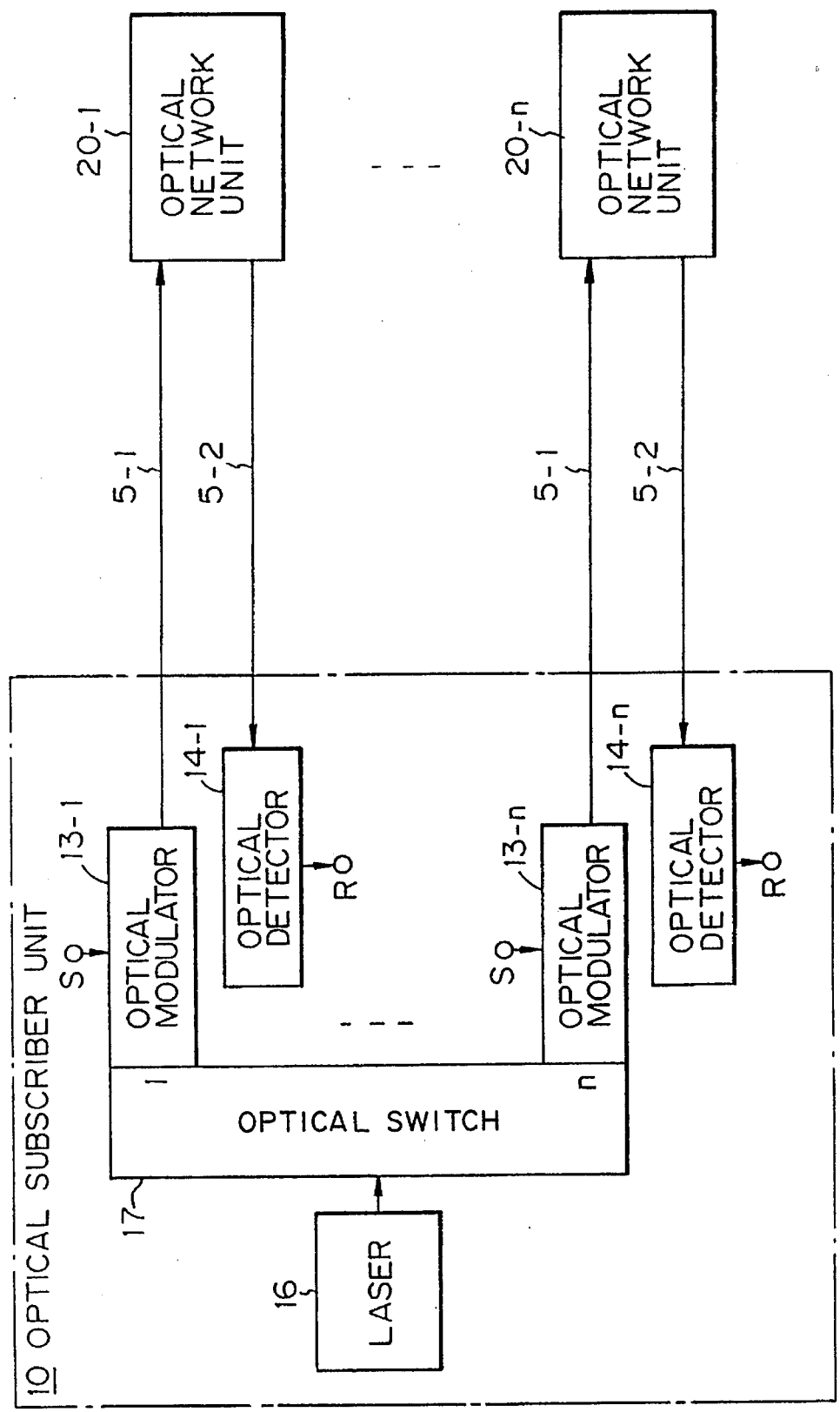

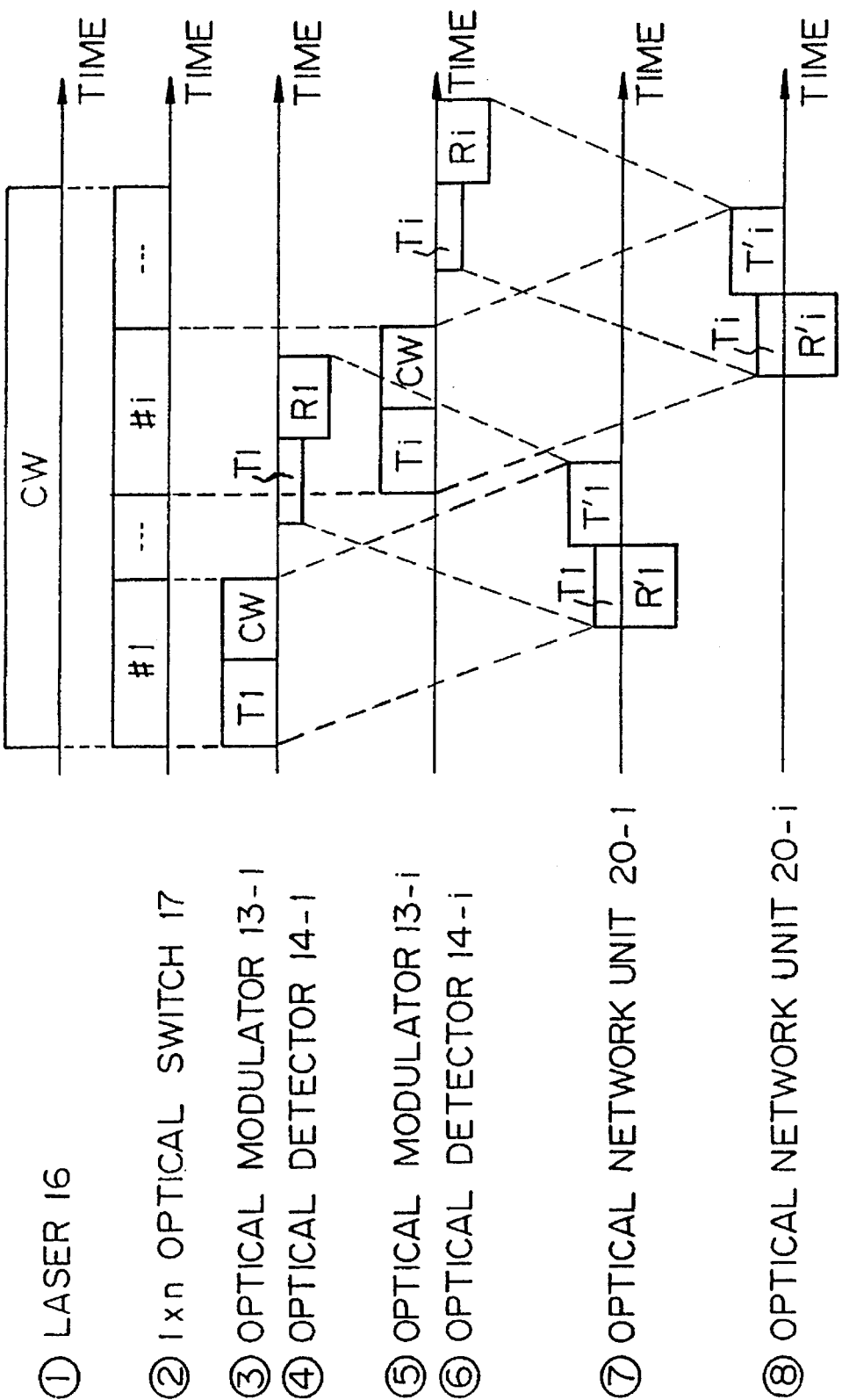

OPERATION OF OPTICAL MODULATOR 13-i
IN A SUBSCRIBER UNIT

OPERATION OF NETWORK UNIT 20-i

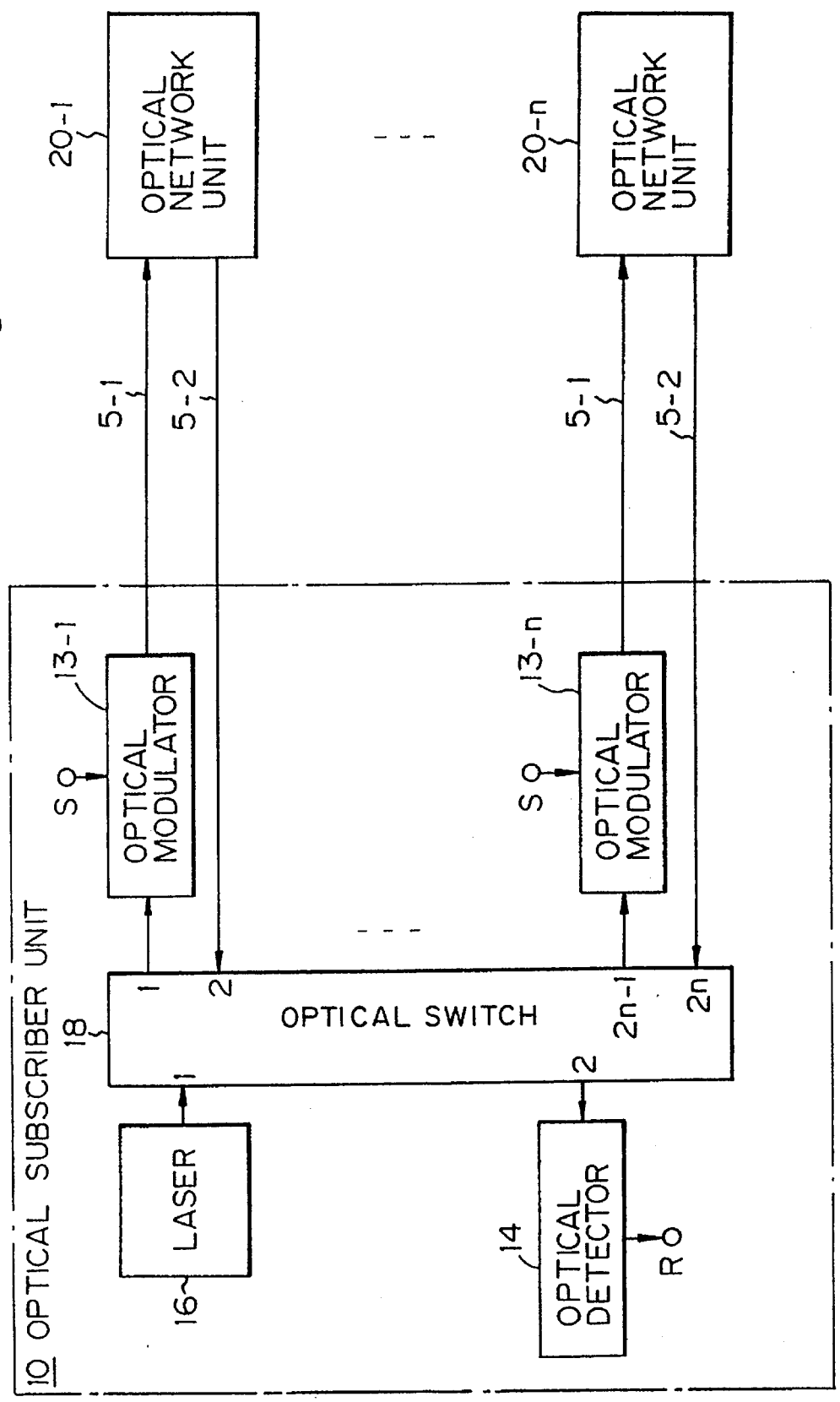

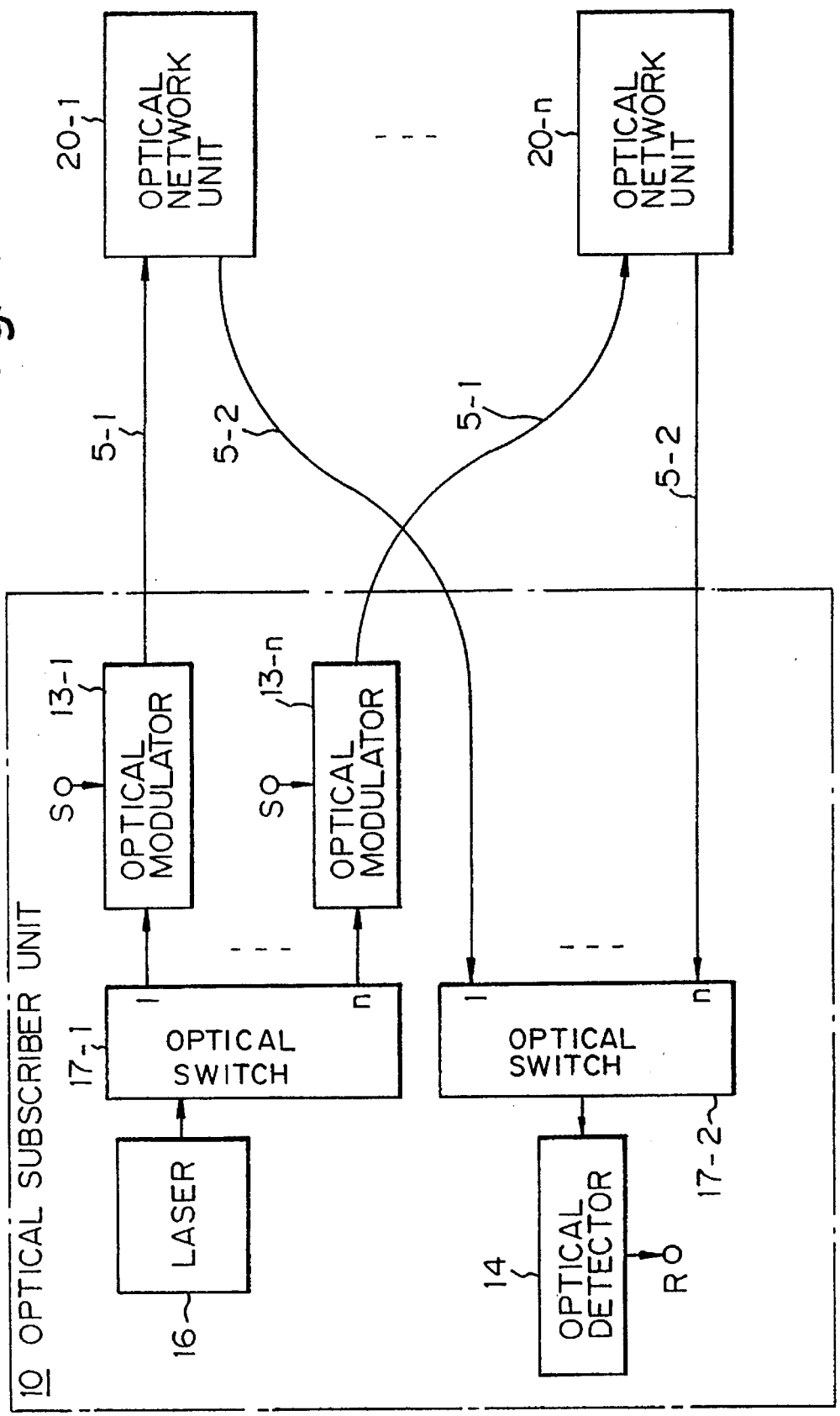

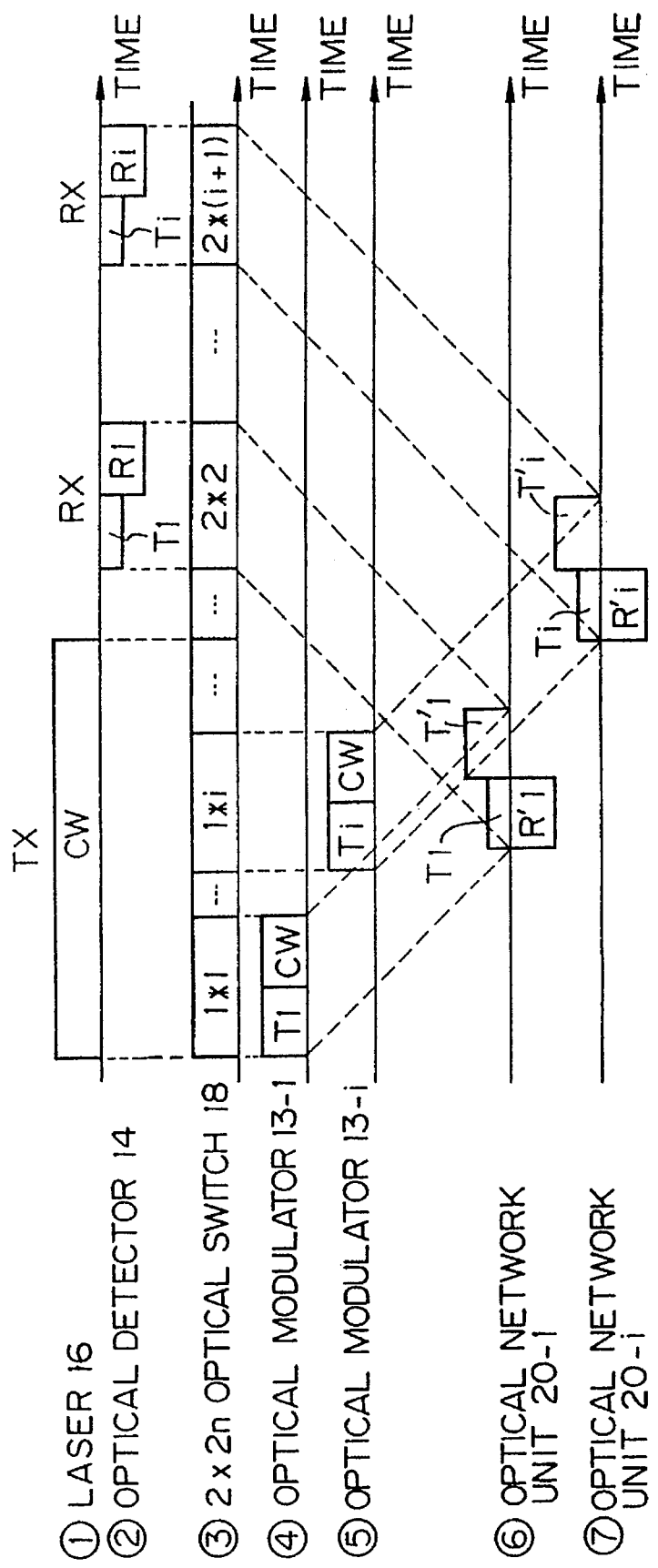

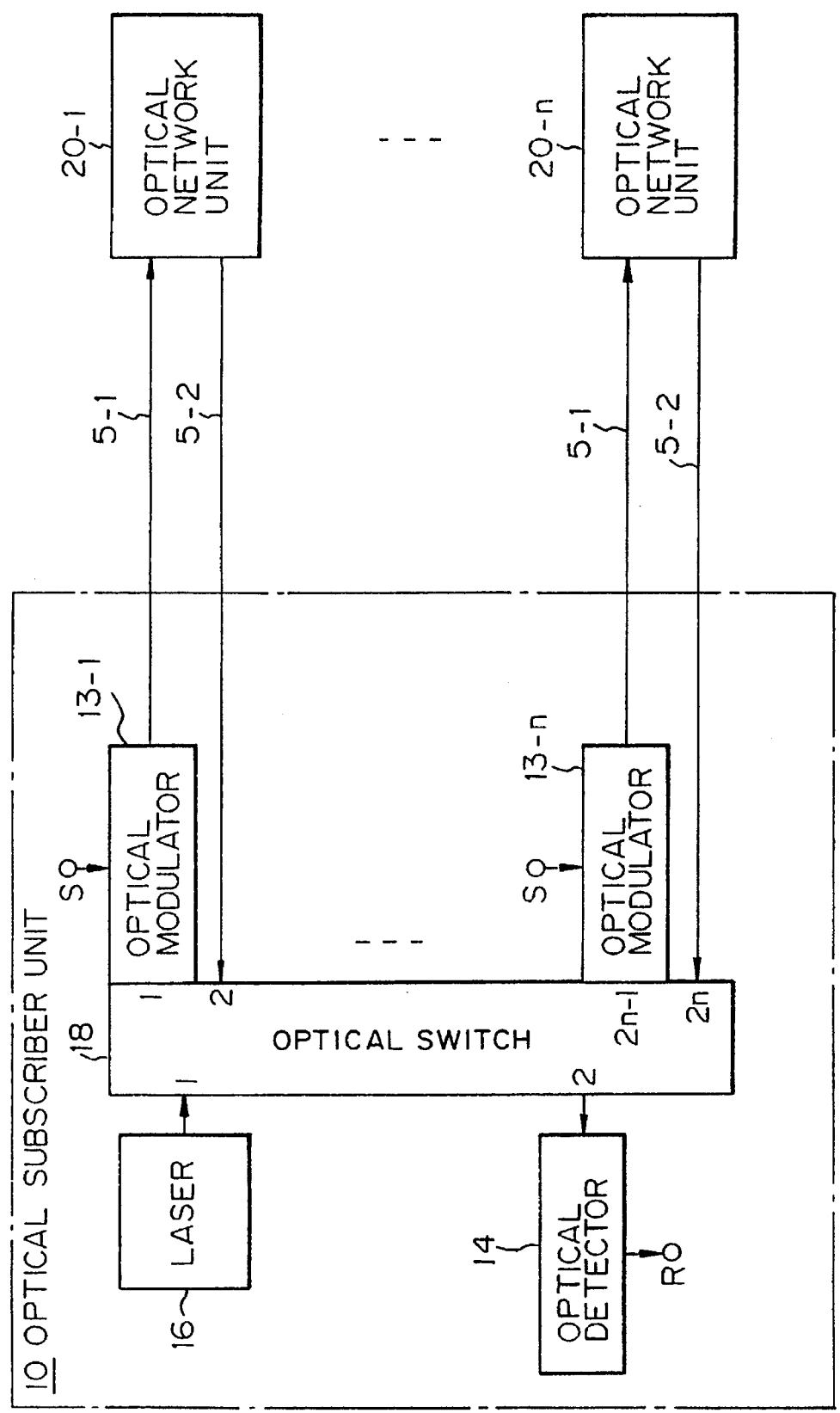

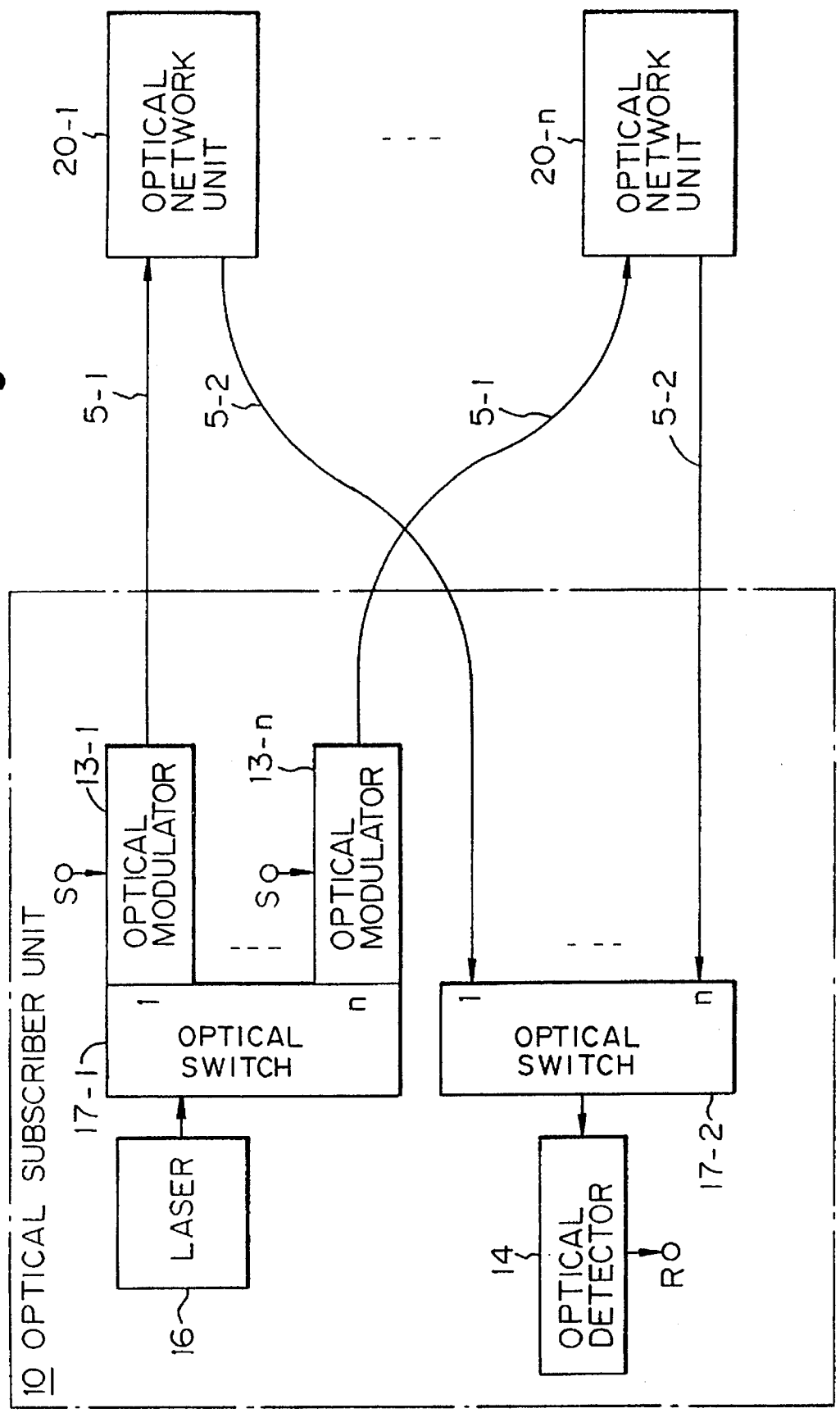

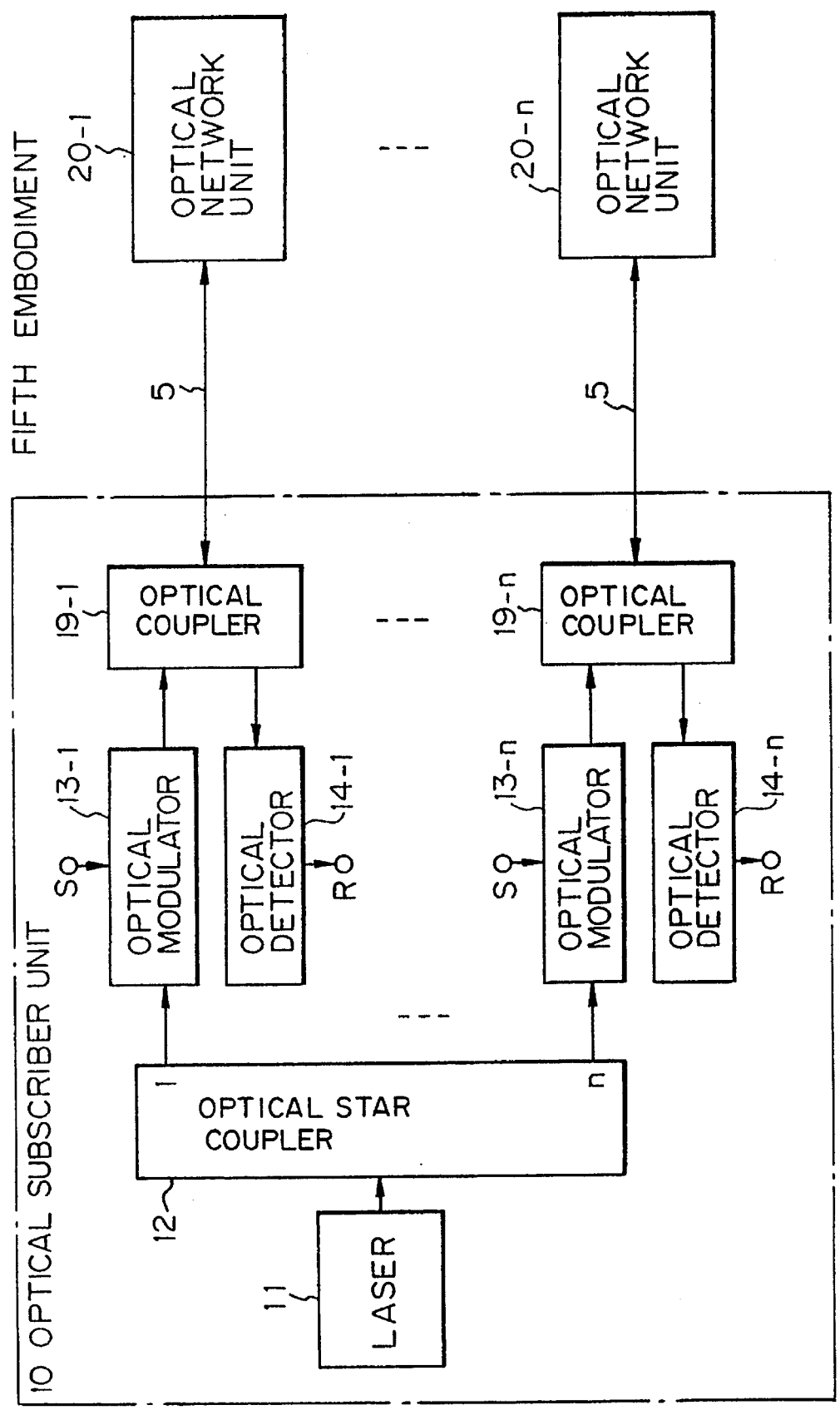

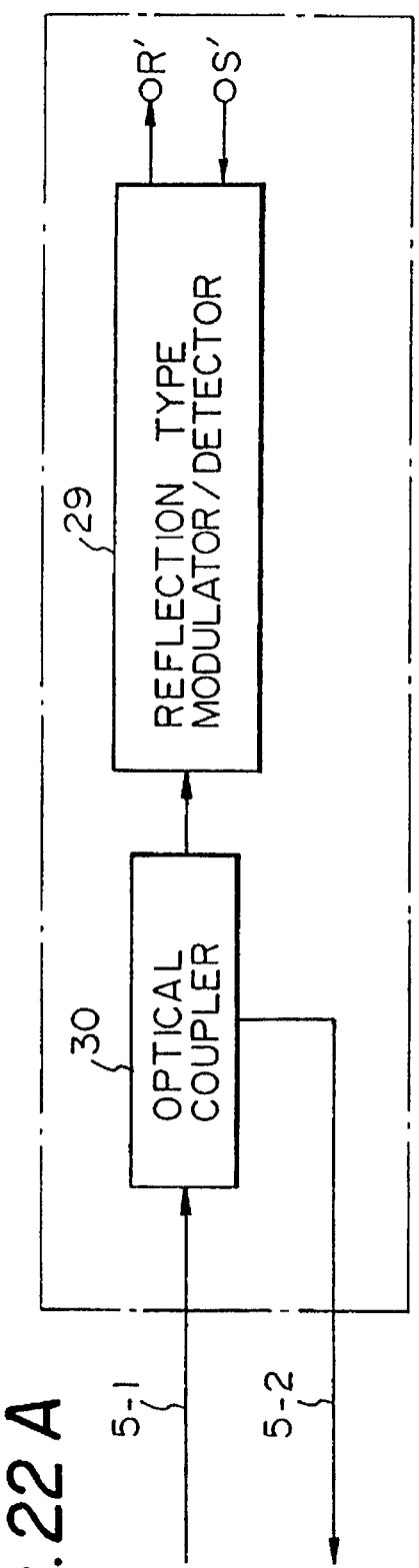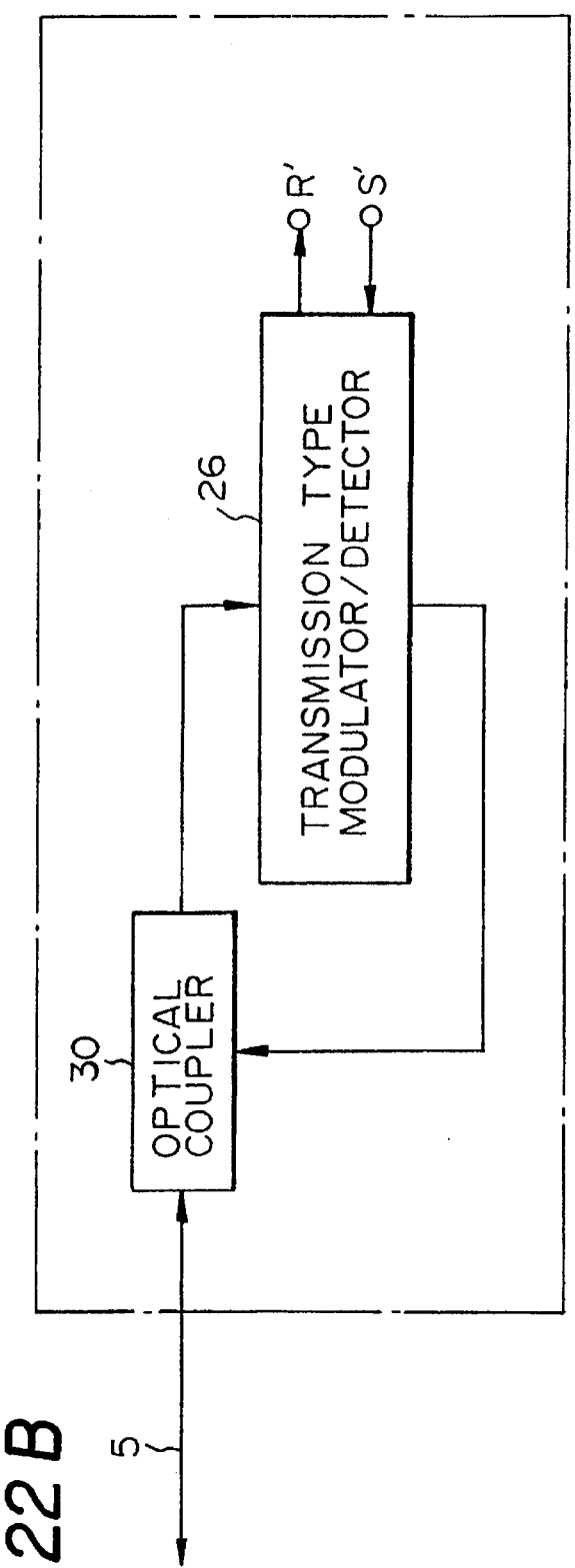

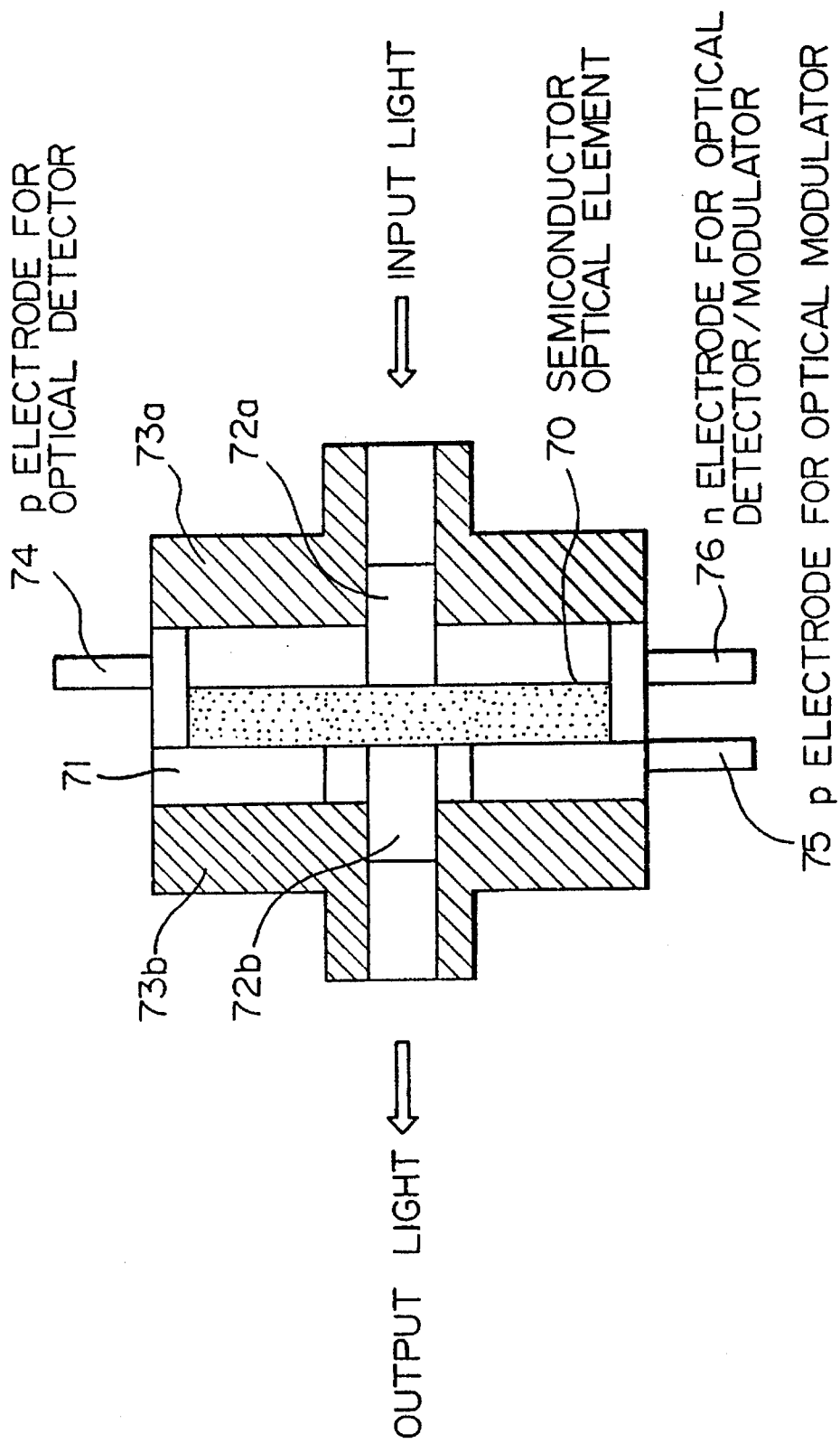

SIGNAL STRUCTURE IN PHASE MODULATION

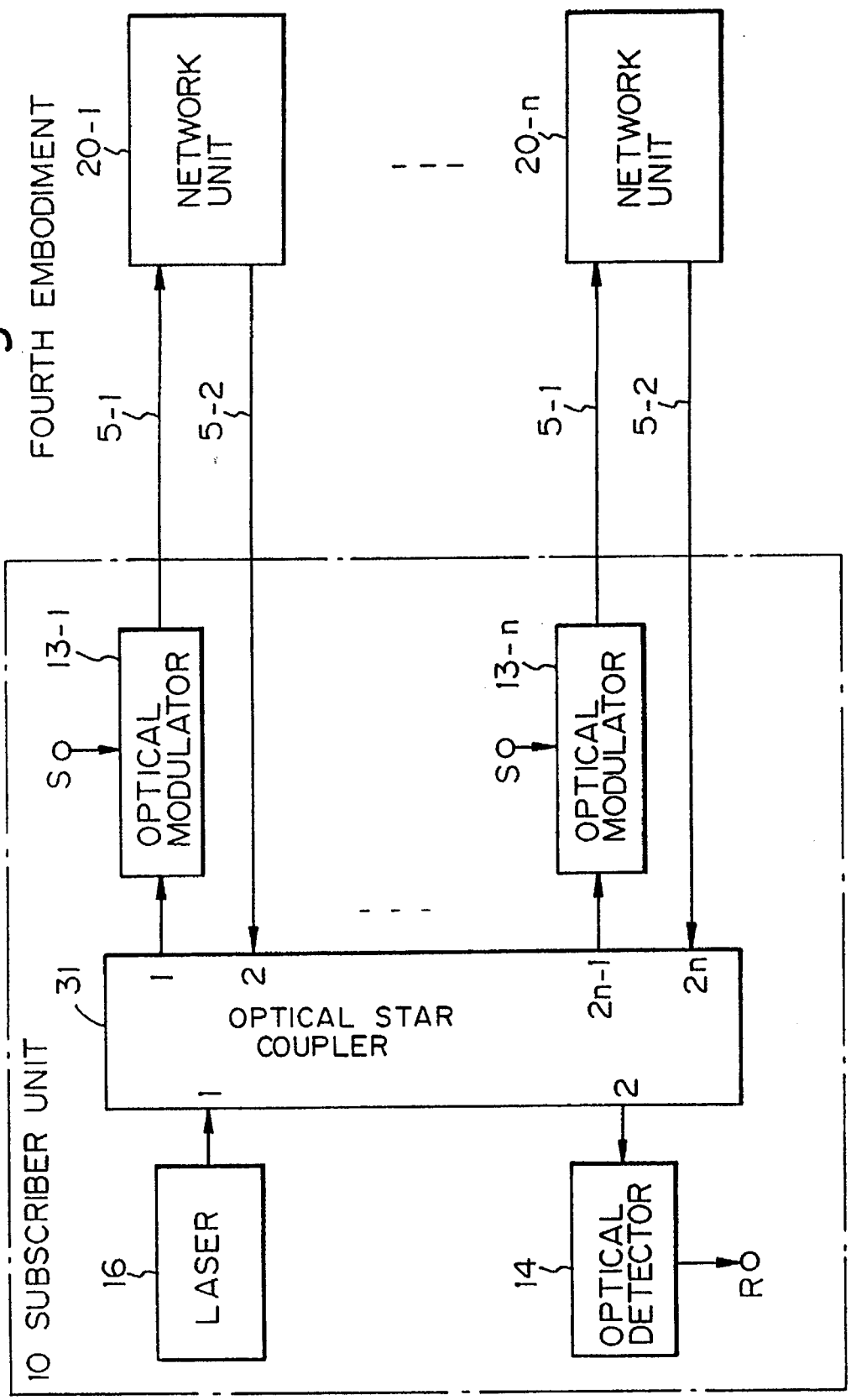

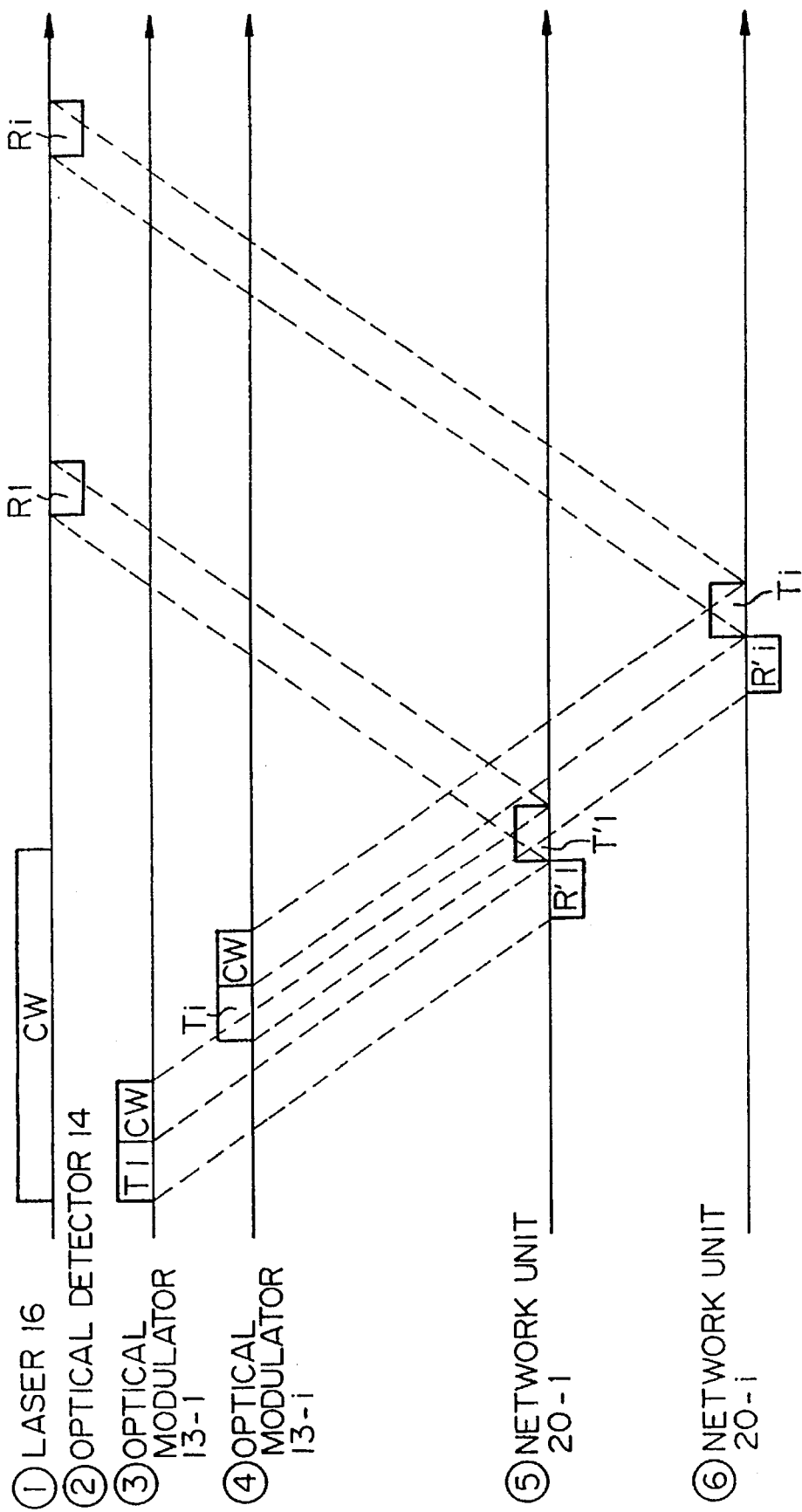

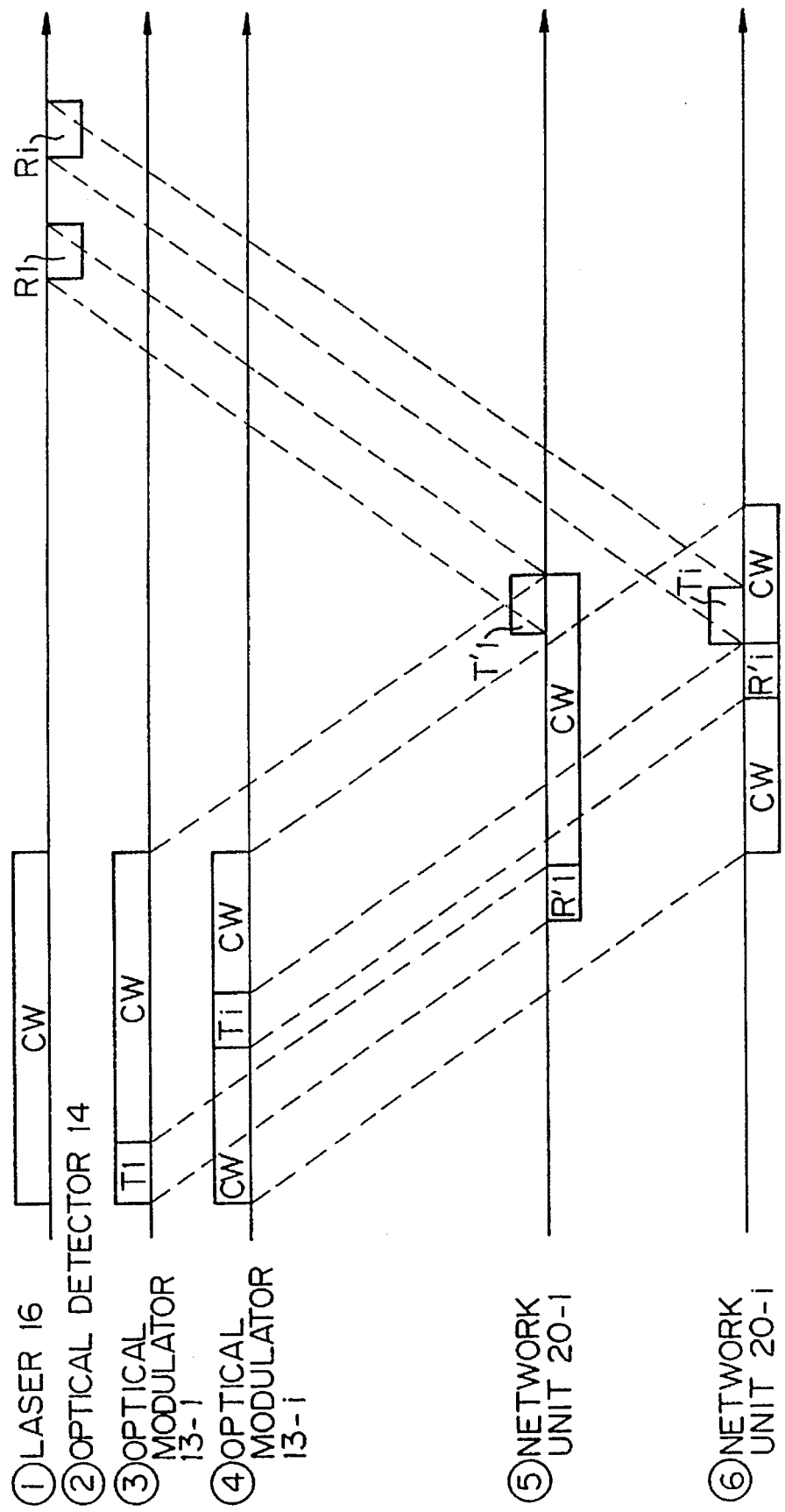

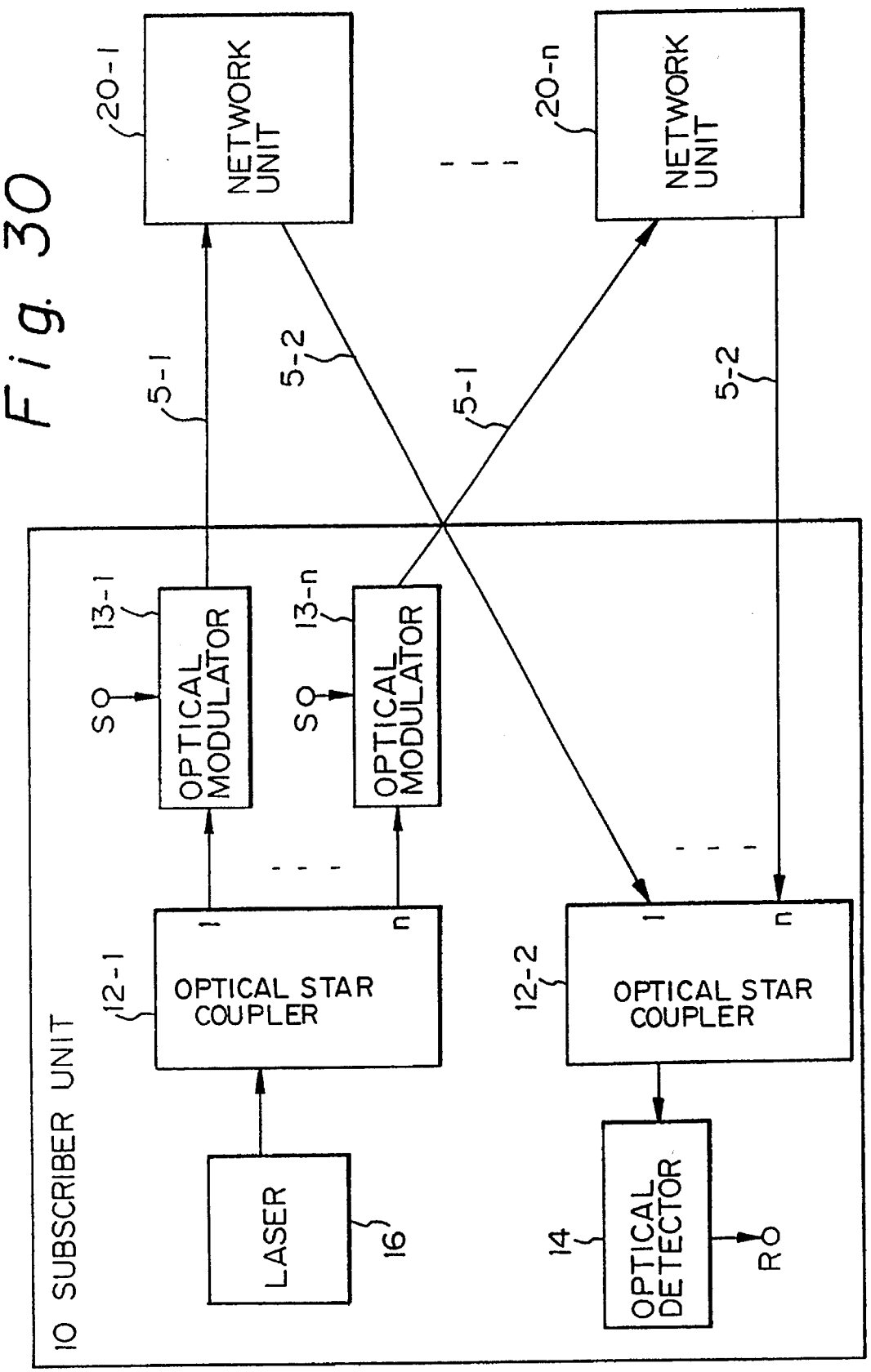

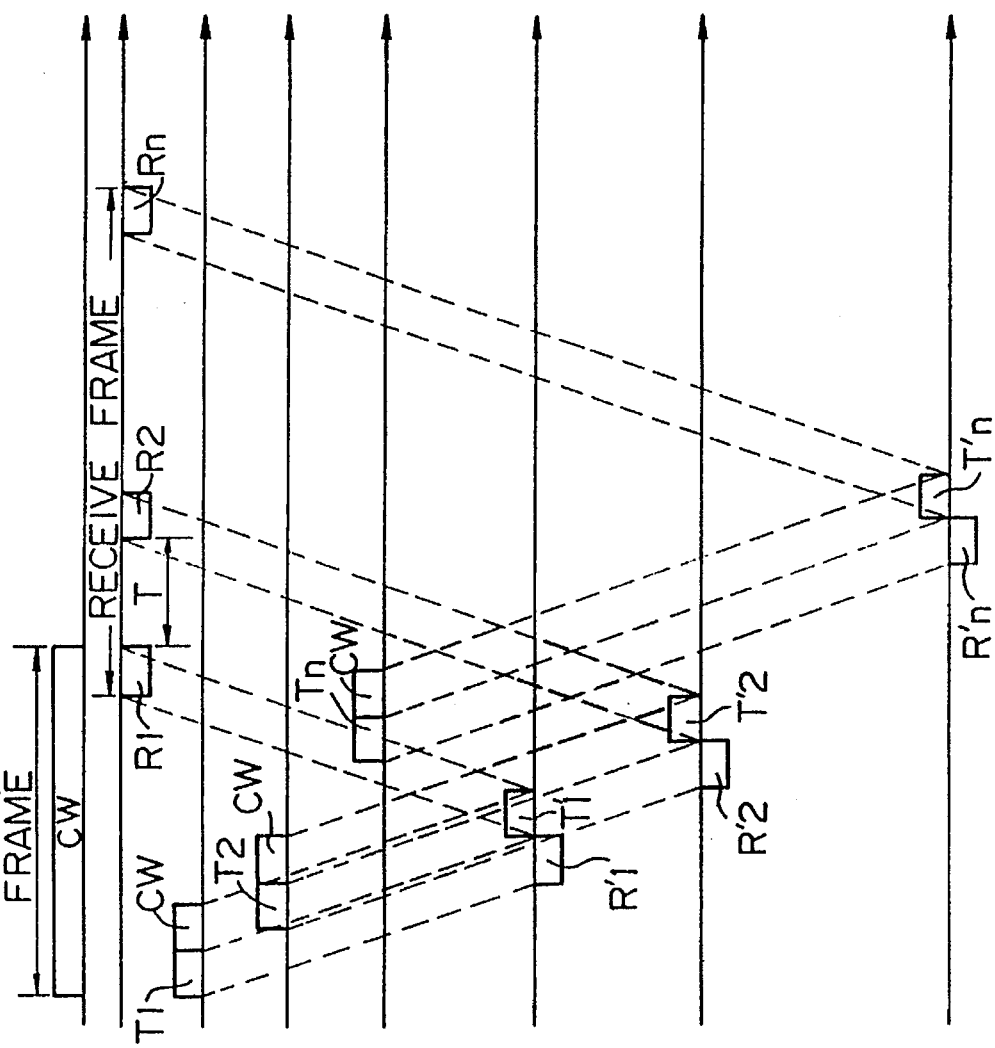

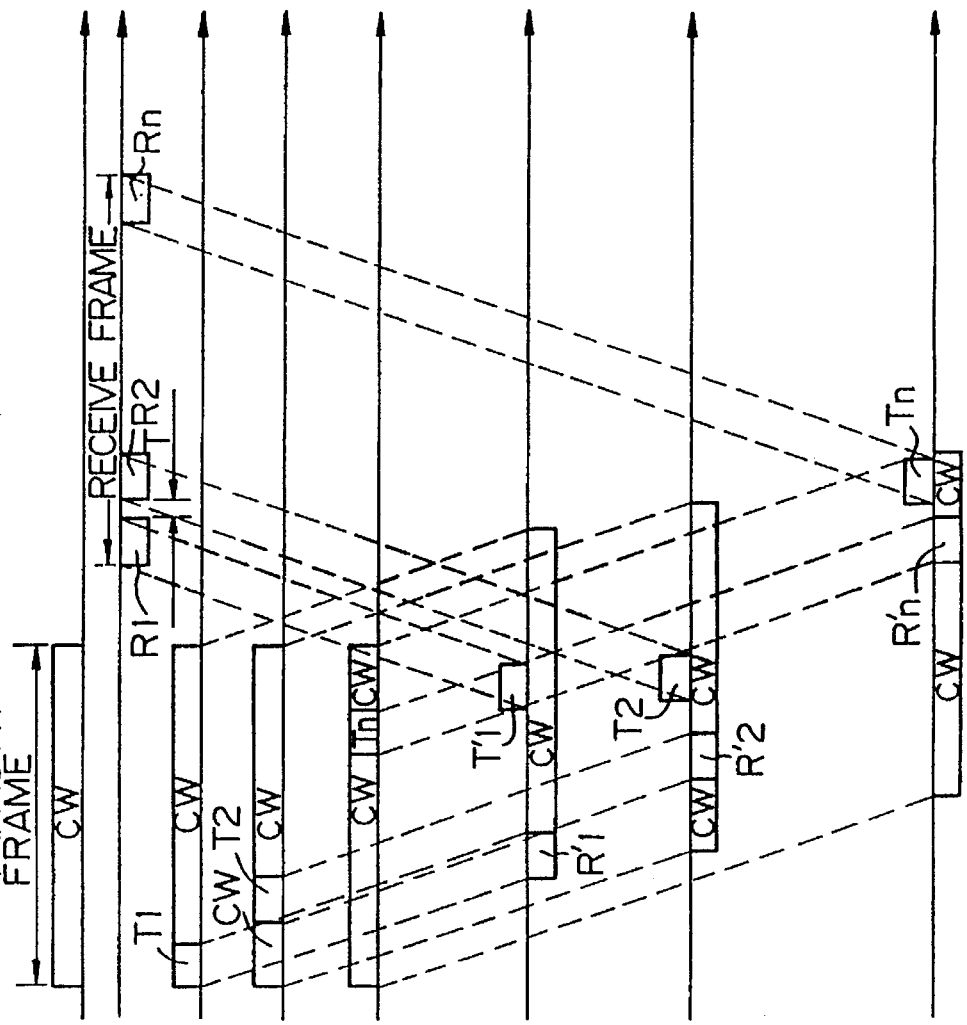

BIDIRECTIONAL OPTICAL TRANSMISSION SYSTEM

BACKGROUND OF THE INVENTION

The present invention relates to an optical bidirectional transmission system, in particular, relates to such a system in which a center station or an optical subscriber unit communicates with a plurality of optical network units through optical fiber cables.

A PDS (Passive Double Star) system has been known as a bidirectional optical transmission system which operates on a time division basis between an optical subscriber unit and a plurality of optical network units.

FIG. 33 shows such a PDS system, in which the numeral 1 is a center station or an optical subscriber unit, 2-1 through 2-n are an optical network unit, and 3 is an optical star coupler which couples a transceiver in an optical subscriber unit 1 with a plurality of optical network units 2-1 through 2-n.

In a PDS system, a downward optical signal from an optical subscriber unit 1 to optical network units 2-1 through 2-n is multiplexed on a time division basis, and the multiplexed signal is split in the star coupler 3 into a plurality of optical signals, each of which is transmitted to a related optical network unit. In a receiving operation, each of the optical network units 2-1 through 2-n takes a time slot related to its own unit. In a transmitting operation, each of the optical network units transmits an optical signal in a designated time slot, and the star coupler 3 multiplexes all the signals of all the optical network units on a single optical line so that the optical subscriber unit 1 receives a time division multiplexed optical signal.

The PDS system has the advantage that a single tranceiver in an optical subscriber unit 1 may communicate with a plurality of optical network units, so that cost in an optical subscriber unit for each network unit may be low.

However, the PDS system has the disadvantage that an optical signal from an optical subscriber unit is attenuated in a star coupler depending upon a number of network units 2-1 through n. Therefore, the maximum number of network units coupled with a subscriber unit through a star coupler is restricted, and thus, the reduction of cost is also restricted.

FIG. 34 shows another prior art, in which an optical subscriber unit 1 has a laser oscillator 11, and an optical modulator which provides a time division multiplex signal. The star couple 3 in FIG. 33 is replaced by an optical switch 13 so that each time slot in a time division multiplexed signal is switched to a related optical network unit, instead of splitting the multiplexed signal.

Although the system in FIG. 34 has the advantage that a multiplexed optical signal is not attenuated in an optical switch, it has the disadvantage that the operation rate in a modulator must be high, and the signal control is complicated, depending upon a number of multiplexed network units.

Therefore, the reduction of cost in an optical subscriber unit for each network units is also restricted.

SUMMARY OF THE INVENTION

An object of the present invention is to provide an improved bidirectional optical transmission system by overcoming disadvantages and limitations of a prior bidirectional optical transmission system.

It is also an object of the present invention to provide a bidirectional optical transmission system which may couple more network units with a subscriber unit.

It is also an object of the present invention to provide a bidirectional optical transmission system in which cost in an optical subscriber unit for each network units is reduced considerably.

The above and other objects are attained by a bidirectional optical transmission system comprising; an optical subscriber unit in a central office and a plurality of optical network units in customer premises, each coupled with the subscriber unit through a respective optical transmission line; the optical subscriber unit comprising; a laser oscillator (11); a splitting device (12) coupled with the laser oscillator to split an output beam of the oscillator into a plurality of beams; a plurality of optical modulators (13-1 through 13-n), each coupled with each beam split by the splitting means, for modulating the beam with a transmission signal S for a respective optical network unit, an output of the optical modulator being coupled with a respective optical network unit through an optical transmission line; and optical detection means coupled with the optical network units through an optical transmission line, to provide a receive signal R from each of the optical network units by converting an optical beam into electrical form; and each optical network unit comprising; optical-electrical conversion means coupled with the optical subscriber unit through the optical transmission line for providing a receive signal (R') by converting an optical beam into electrical form; and conversion means coupled with the optical subscriber unit through the optical transmission unit for modulating a beam to the optical subscriber unit.

BRIEF DESCRIPTION OF THE DRAWINGS

The foregoing and other objects, features, and attendant advantages of the present invention will be appreciated as the same become better understood by means of the following description and accompanying drawings wherein;

FIG. 1 is a block diagram of first embodiment of a bidirectional optical transmission system according to the present invention, FIGS. 4A and 4B show operational characteristic curves of the transmission type detector/modulator in FIG. 3, FIG. 5 shows operational time charts in the first embodiment, when modulated beam and non-modulated beam are sent serially on time division multiplex basis, FIG. 9 shows a block diagram of second embodiment of a bidirectional optical transmission system according to the present invention, FIG. 10 is a modification of the second embodiment of FIG. 9, FIG. 11 shows operational time charts in the second embodiment, FIG. 13 shows a block diagram of third embodiment of a bidirectional optical transmission system according to the present invention, FIG. 14 is a modification of the third embodiment of FIG. 13, FIG. 15 shows an operational time chart in the third embodiment, FIGS. 17A and 17B show another modification of a block diagram of the third embodiment, FIG. 18 is a block diagram of fifth embodiment of a bidirectional optical transmission system according to the present invention, FIG. 24 shows structure of an optical detector/modulator, FIG. 26 shows a block diagram of fourth embodiment of a bidirectional optical transmission system according to the present invention, FIG. 27 shows an operational time chart in fourth embodiment, FIG. 28 shows another operational time chart in fourth embodiment, FIG. 30 is modification of structure in fourth embodiment, FIG. 31 shows an operational time chart in fourth embodiment, FIG. 32 shows another operational time chart in fourth embodiment.

Figure 2A:
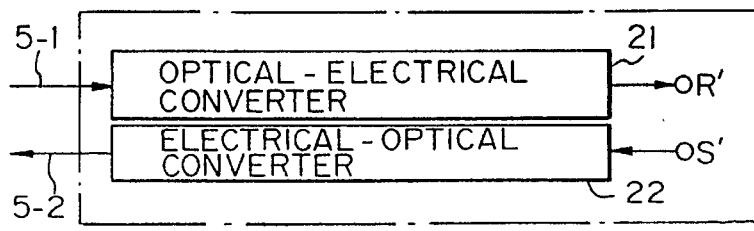
FIGS. 2A–2B show some embodiments of an optical network unit in the first embodiment according to the present invention.

DESCRIPTION OF THE PREFERRED EMBODIMENTS (First embodiment)

FIG. 1 shows a block diagram of a bidirectional optical transmission system according to the present invention. In the figure, the numeral 10 is an optical subscriber unit or a center unit, which is coupled with a plurality of optical network units or user units 20-1 through 20-n. Each of the optical network units are coupled with the optical subscriber unit 10 with a pair of single mode optical fiber cables 5-1 and 5-2. The optical subscriber unit 10 has a laser oscillator 11, a star coupler 12 coupled with the laser oscillator 11 so that an output beam of the laser oscillator 11 is split into n number of beams, a plurality of optical modulators 13-1 through 13-n (n is an integer larger than 2) each corresponding to a related optical network unit for sending an optical signal from the optical subscriber unit 10 to the related optical network unit, and a plurality of optical detectors 14-1 through 14-n for receiving an optical beam from the related optical network unit and for converting the receive beam into an electrical signal R. A power supply circuit and a control circuit for operating the apparatuses are omitted in FIG. 1.

In operation, D.C. optical beam or non-modulated beam generated in the optical oscillator 11 is split in the star coupler 12 into n number of beams, and each split beam is applied to one of the optical modulators 13-1 through 13-n, each relating to a specific optical network unit. Each of the optical modulators 13 modulates the D.C. optical beam provided by the star coupler 12 with the transmission signal S for the related optical network unit, and the output of the optical modulator is forwarded to the related optical network unit through the optical fiber cable 5-1. Similarly, the optical receive beam from the related optical network unit through the optical fiber cable 5-2 is applied to the related optical detector (14-1 through 14-n) which converts the receive optical beam into the electrical signal R.

The structure of FIG. 1 has the advantages that many optical network units may be coupled with each optical subscriber unit. When output of the laser oscillator 11 is around 15 dBm (=32 mW), more than 1000 optical network units may be coupled with an optical subscriber unit. Further, since an optical modulator (13-1 through 13-n) is provided for each optical network unit, the operational rate (or speed) of the modulated signal is slow irrespective of the increase of the number of optical network units.

Other embodiments described later have the same advantages as that of FIG. 1.

FIG. 2 shows some embodiments of an optical network unit 20 (20-1 through 20-n) in FIG. 1.

FIG. 2(A) shows the first embodiment, in which the optical network unit has an optical-electrical converter 21, and an electrical-optical converter 22 which has an optical source. An optical signal from an optical subscriber unit 10 through an optical fiber cable 5-1 is applied to the optical-electrical converter 21 which provides a received signal R'. The transmission signal S' to the optical subscriber unit 10 is converted into an optical signal in the electrical-optical converter 22, which forwards the converted optical signal to the optical subscriber unit 10 through the optical fiber cable 5-2.

Figure 2B:
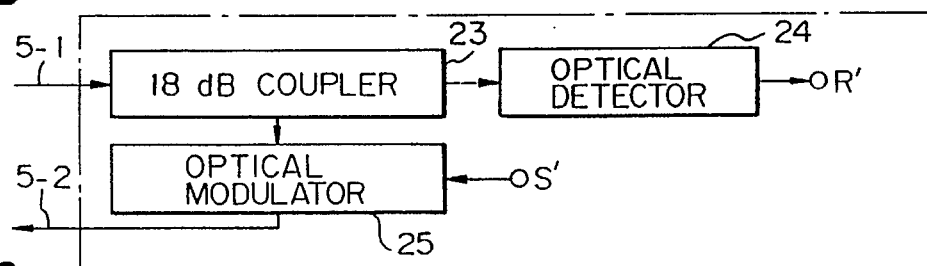
Figure 2C:
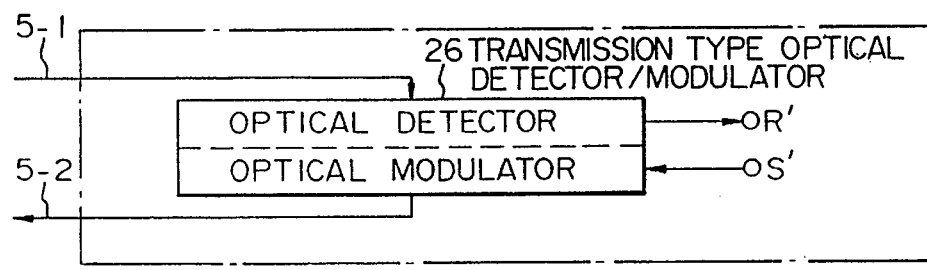
Figure 2D:
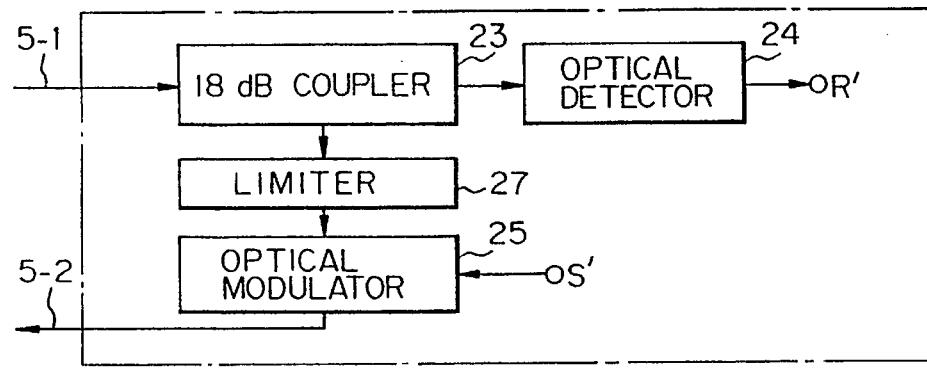

FIG. 2(B), FIG. 2(C) and FIG. 2(D) show the embodiments in which no optical source is provided in an optical network unit. In that case, an optical network unit uses a non-modulated portion of an optical beam received from an optical subscriber unit. In that case, the non-modulated portion may be either time division multiplexed with the modulated portion, or superposed with the modulated portion. FIG. 2(B) and FIG. 2(C) related to the former, and FIG. 2(D) relates to the latter.

An optical network unit in FIG. 2(B) has an 18 dB coupler 23. A small part of the received signal through the cable 5-1 applied to the 18 dB coupler 23 is forwarded to the optical-electrical converter (optical detector) 24 with the attenuation of 18 dB, so that the converter (detector) 24 takes the received signal R' in the modulated portion of the received optical signal. The rest of the received signal is forwarded to the electrical-optical converter (optical modulator) 25, which modulated the non-modulated portion of the received beam with the transmission signal S', so that the modulated optical signal is forwarded to an optical subscriber unit through the cable 5-2.

FIG. 2(C) has a transmission type optical detector/modulator 26, which integrates an optical detector and an optical modulator. The received beam through the cable 5-1 is converted into an electrical signal R' in the optical detector portion of the device 26. The optical beam, which passes the optical detector portion, is then applied to the optical modulator portion which modulates the non-modulated portion of the received beam with the transmission signal S', and the beam modulated with the signal S' is forwarded to the optical subscriber unit through the cable 5-2.

FIG. 2(D) is similar to FIG. 2(B), but has a limiter 27 between the 18 dB copuler 23 and the optical modulator 25. The received beam from the cable 5-1 is applied to the optical detector 24 through the 18 dB coupler 23 to provide the received signal R' in the modulated portion of the received beam. Simultaneously, the rest of the beam in the 18 dB copuler 23 is applied to the limiter 27 which provides the DC component of the received beam. The DC component is applied to the optical modulator 25 which modulates the DC component of the optical beam with the transmission signal S' so that the modulated optical beam is forwarded to an optical subscriber unit through the cable 5-2. The optical limiter 27 may have an optical amplification element which has a saturation level lower than the strength of an input optical beam.

Figure 3:
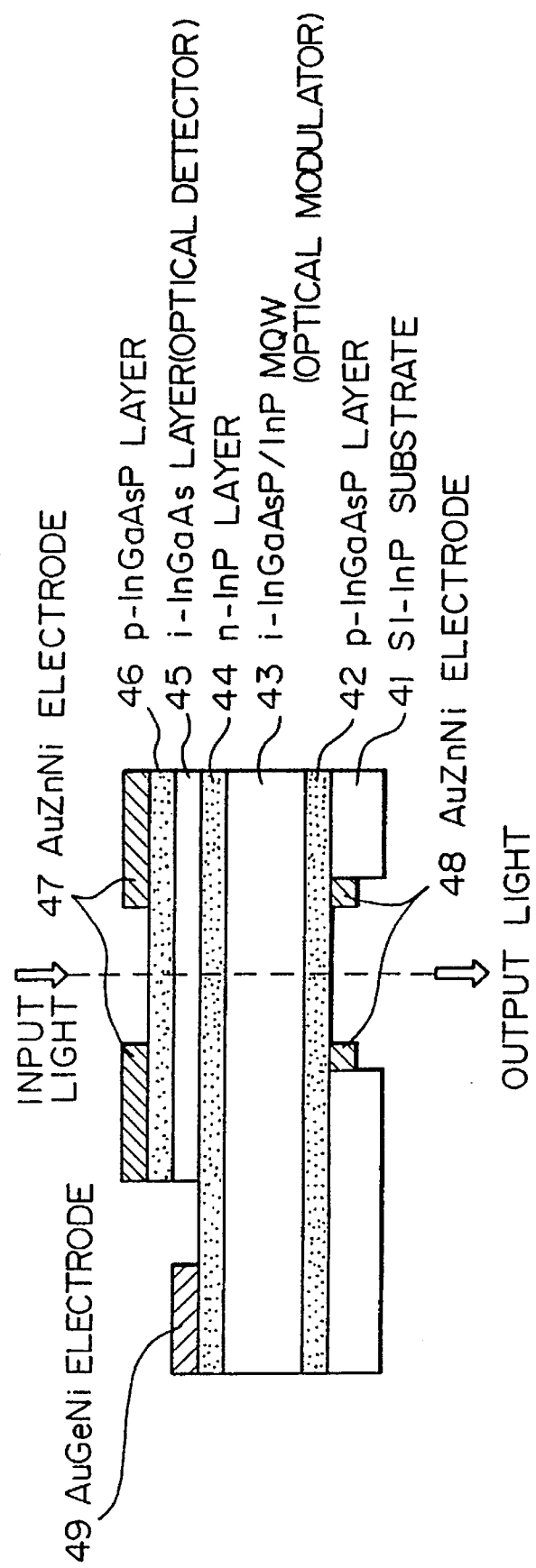
FIG. 3 shows cross section of a transmission type optical detector/modulator according to the present invention.

FIG. 3 shows cross section of a transmission type optical detector/modulator 26. The structure of FIG. 3 is called a plane type detector/modulator, since an input beam (and an output beam) is applied to the device perpendicular to the plane of the layers. The plane type is distinct from a non-plane type in which a beam is applied along (not perpendicular) to the plane of the layers. In the figure, the numeral 41 is a substrate made of SI—InP, on which a layer 42 of p-InGaAsP (bandgap wavelength is $\lambda_g$=1.2 µm) with thickness 0.3 µm, a layer 43 of i-InGaAsP/InP MQW (multiple quantum well) with thickness 4 µm, a layer 44 of n-InP with thickness 0.3 µm, a layer 45 of i-InGaAs with thickness 0.2 µm, and a layer 46 of p-InGaAsP ($\lambda_g$=1.2 µm) with thickness 0.3 µm are laminated through Metal Organic Chemical Vapour Deposition process (MOCVD).

A p-electrode layer 47 of AuZnNi for beam detection is deposited on the layer 46 of p-InGaAsP except for an opening for an input beam, and the corresponding portion in the layer 41 of SI—InP related to the opening is removed through an etching process. A p-electrode layer 48 of AuZnNi for optical modulation is deposited on the layer 42 which appeared in said etching process, except for an opening for deriving an output beam.

Further, a part of the crystalline bodies on the layer 44 of n-InP is removed, and a common n-electrode 49 of AuGeNi common for optical detection and optical modulation is deposited on the removed portion.

The layer 46 of p-InGaAsP is a crystalline for ohmic contact with the layer 47 of AuZnNi (p-electrode for optical detection). The layer 42 of p-InGaAsP is a crystalline for ohmic contact with the layer 48 of AuZnNi (p-electrode for optical modulation). The layer 44 of n-InP is a crystalline for ohmic contact with the layer 49 of AuGeNi (n-electrode common for optical detection and optical modulation). The layer 45 of i-InGaAs is an absorption region for an optical detector. The layer 43 of i-InGaAsp/InP of multiple quantum well is a crystalline for optical modulation.

FIGS. 4A and 4B show curves of absorption spectrum of an optical detection portion (FIG. 4(A)) and an optical modulation portion (FIG. 4(B)) of the transmission type optical detector/modulator 26, in which the horizontal axis shows wavelength, and the vertical axis shows absorption coefficient.

In FIG. 4(A) which shows optical absorption in an optical detection portion, the maximum wavelength of the absorption is 1.65 µm, and therefore, the optical coefficient for the wavelength 1.3 µm is very high so that a thin layer is enough for detecting an optical beam. In FIG. 4(B) which shows optical absorption in an optical modulation portion, the curve (a) shows the case that no bias potential is applied to the device. When the reverse bias potential applied to the device is coming high, the curve shifts to (b), (c) and (d), because of the Quantum Confined Stark Effect (QCSE) in the multiple quantum well layer 43 of i-InGaAsP/InP. Therefore, when a transmission signal S' is imposed with DC reverse bias potential, the absorption coefficient for the wavelength 1.3 µm is modulated, so that the optical output beam modulated with the transmission signal S' is obtained. In the current embodiment, the modulated beam is obtained with the signal of 2 V (peak-to-peak), and the ON/OFF ratio is 10 dB.

As a modification of FIG. 3 which has an i-InGaAsP/InP multiple quantum well layer as a crystalline for optical modulation, the use of an i-InGaAsP bulk layer ($\mu_g$=1.3 µm) is possible. As to the growth of a bulk layer, no metal organic chemical vapour deposition process (MOCVD) is necessary, but conventional liquid phase growth process (LPE) is possible. Therefore, the producing cost of the element is reduced by using a bulk layer, although the necessary voltage for optical modulation must be high. The change of absorption coefficient depending upon voltage change to a bulk layer comes from a Franz-Keldysh effect. In order to increase the ON/OFF ratio in an optical modulator which has a single layer, the thickness of the element must be increased so that the absorption coefficient at the OFF state is increased. However, since the thickness with which an electrical field is applied is restricted, the ON/OFF ratio is not increased merely by increasing the thickness of the layer. In other words, a single layer element can not provide a large ON/OFF ratio.

Figure 23A:
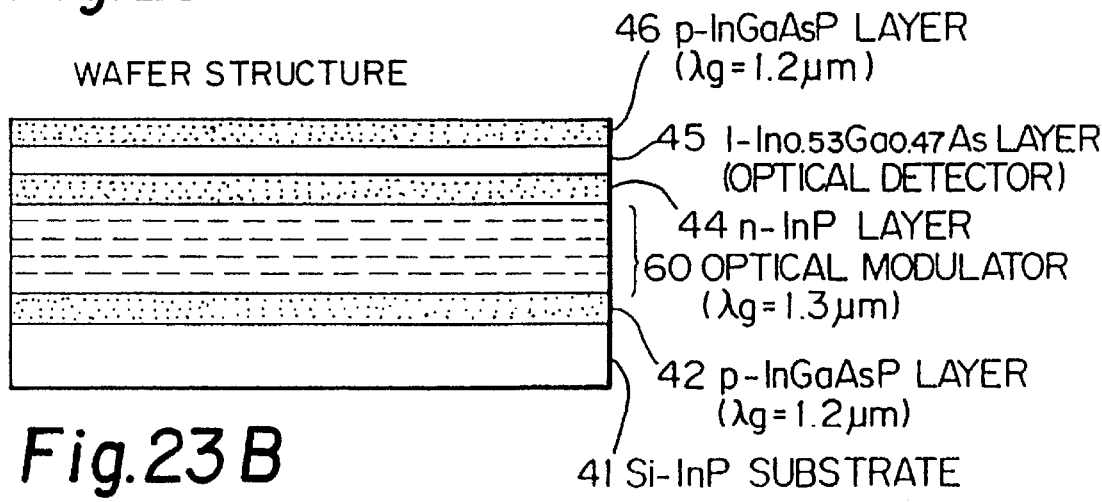
FIGS. 23A–23C shows cross section of another optical detector/modulator.
Figure 23B:
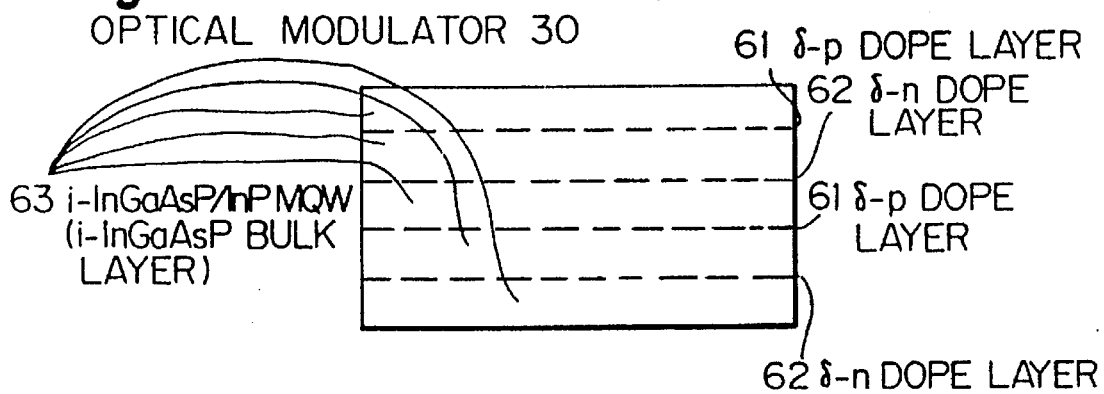
Figure 23C:
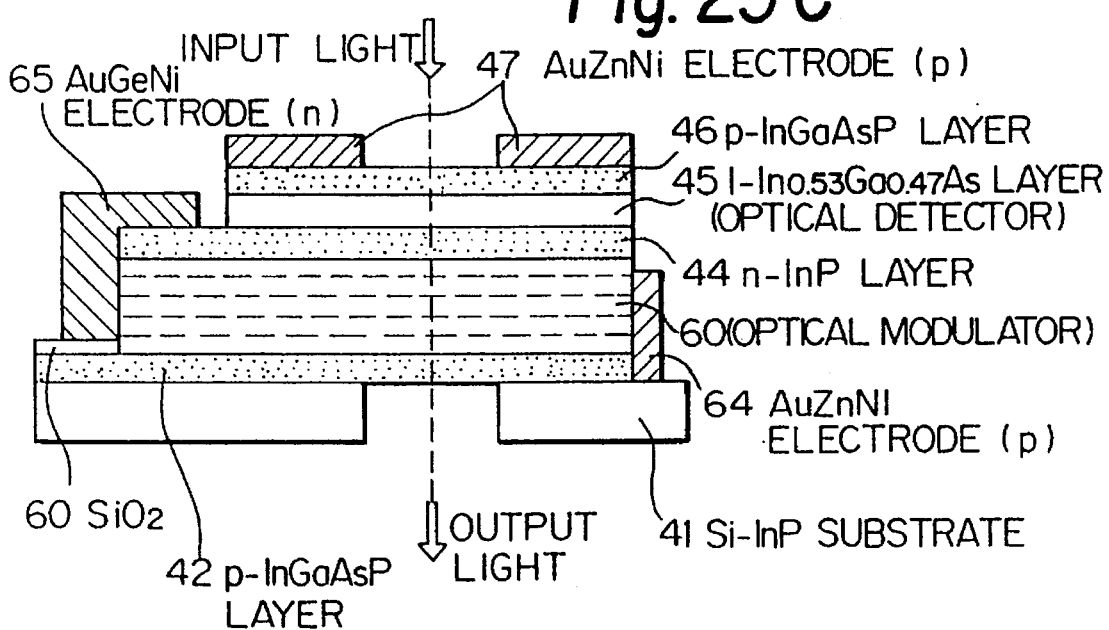

FIG. 23 shows the structure of the device which solves the above problem. FIG. 23(A) shows a cross section of a wafer structure, FIG. 23(B) shows the structure of an optical modulation layer, and FIG. 23(C) shows the structure of the device. The present device has an optical modulation layer with δ-doped multiple layers, instead of an i-In GaAsP/InP multiple quantum well layer or an i-InGaAsP bulk layer as an optical modulator. The δ-doped layer is defined as a layer that a dopant is laminated like seats when crystalline growth is carried out. The thickness of the same is very thin, less than one atom layer. The multiple layers structure of the above provides several times as thick as a single layer. The multiple layers structure is essentially equivalent to a plurality of single layers which are coupled in series with one another, and therefore, the absorption coefficient at the OFF state may be large and the large ON/OFF ratio is obtained. The δ-dope is used for preventing leakage current between a p-electrode by an AuZnNi electrode 64 and a δ-n dope layer 62, and between an n-electrode by an AuGeNi electrode 64, and for decreasing the absorption of transmission light in a dopant.

FIG. 24 shows the whole structure of the transmission type optical modulator thus described. In the figure, the semiconductor element 70 is supported on a support 71, and a rod lens 72a and a rod lens 72b are provided at a light input port and a light output port, respectively. The whole structure is sandwiched by a pair of receptors 73a and 73b which are connectors for optical fibers. An input light is collimated by a rod lens 72a, and is applied to the semiconductor element 70, and an output light is converged on a core of an end of an optical connector. An optical connector 73a, 73b may be FC type, SC type, or any other type. The semiconductor element 70 has a p-electrode 74 for an optical detector, a p-electrode 75 for an optical modulator, and an n-electrode for optical detector/modulator on a side wall of the element.

As a modification, a rod lens may be removed when requested insertion loss is not severe. In that case, an end of a fiber is positioned close to the semiconductor element 70.

FIG. 5 shows an operational time chart in the present bidirectional optical transmission system, where a modulated signal and a non-modulated signal are transmitted serially in time division multiplex basis.

In the figure, (1) through (4) show the operation of an optical subscriber unit 10, and (5) and (6) show the operation of an optical network units 20-1 and 20-i, respectively.

The chart (1) shows the operation of an optical modulator 13-1, where T1 shows a modulated beam directed to an optical network unit 20-1, and CW shows a non-modulated beam directed to the optical network unit 20-1, following the modulated beam.

The chart (5) shows the operation of the optical network unit 20-1, where R'1 is a received beam which is obtained by a part of the modulated beam T1. The rest of the modulated beam T1 is offset and returned to the optical subscriber unit 10. The symbol T'1 is the modulated beam which is obtained by modulating the non-modulated beam CW with the transmission signal S'.

The chart (3) shows the operation of an optical detector 14-1, in which T1 is the returned signal by the optical network unit 20-1, and is disregarded. R1 is the modulated received signal which is obtained by modulating the non-modulated signal CW with the transmission signal S'.

The chart (2) shows the operation of an optical modulator 13-i in the optical subscriber unit 10, the chart (6) shows the operation of an optical network unit 20-i, the chart (4) shows the operation of an optical detector 14-i. The operation in those charts is similar to that of the optical modulator 13-1, the optical network unit 20-1, and the optical detector 14-1.

It should be noted that an optical subscriber unit has an optical modulator 13 and an optical detector 14 for each optical network unit, and therefore, an optical subscriber unit has only to control transmission timing to each optical subscriber network unit.

The operation of FIG. 5 has the feature that a modulated signal T and a non-modulated signal CW are transmitted serially in time division multiplex basis. As a modification, when the structure of FIG. 2(D) is taken, it is possible to superpose a modulated signal T1 and non-modulated signal CW, and transmit those signals simultaneously, instead of serial time division multiplex transmission. In case of transmission of an analog signal, since no time division multiplex transmission of a modulated signal and a non-modulated signal is possible, we must take the latter configuration.

Figure 6A:
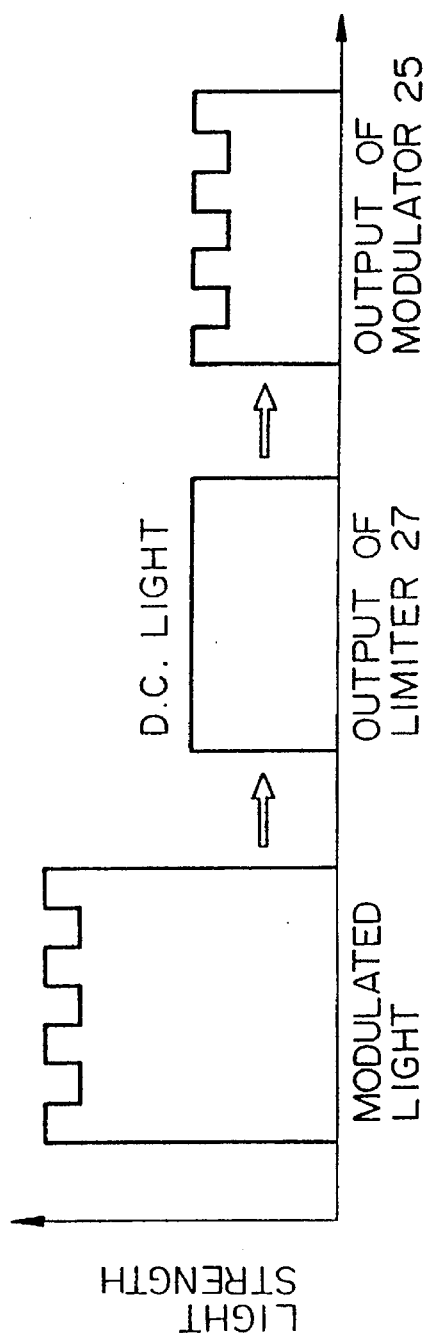
FIGS. 6A and 6B show operation of an optical network unit, when an optical subscriber unit sends modulated beam imposed on non-modulated beam.
Figure 6B:
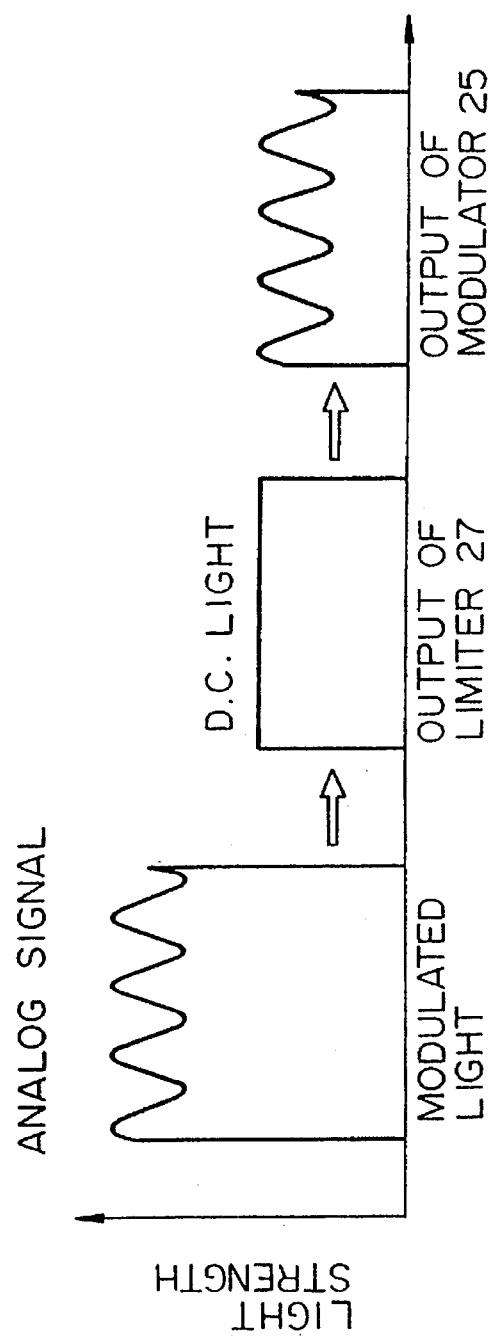

FIGS. 6A and 6B shows the operation of an optical network unit of FIG. 2(D), when a non-modulated signal is superposed with a modulated signal. The modulated beam superposed on a non-modulated beam is obtained merely by modulating a beam with a small modulation index, but no actual superpose operation of a modulated beam and a non-modulated beam is necessary. The operation (1) shows the case of a digital signal, and the operation (2) shows the case of an analog signal. As shown in those figures, a modulated signal is split by a 18 dB coupler 23, and a limiter 27 removes the modulated component in the split modulated signal to provide a non-modulated signal, which is modulated with a transmission signal S' in the modulator 25.

Figure 7:
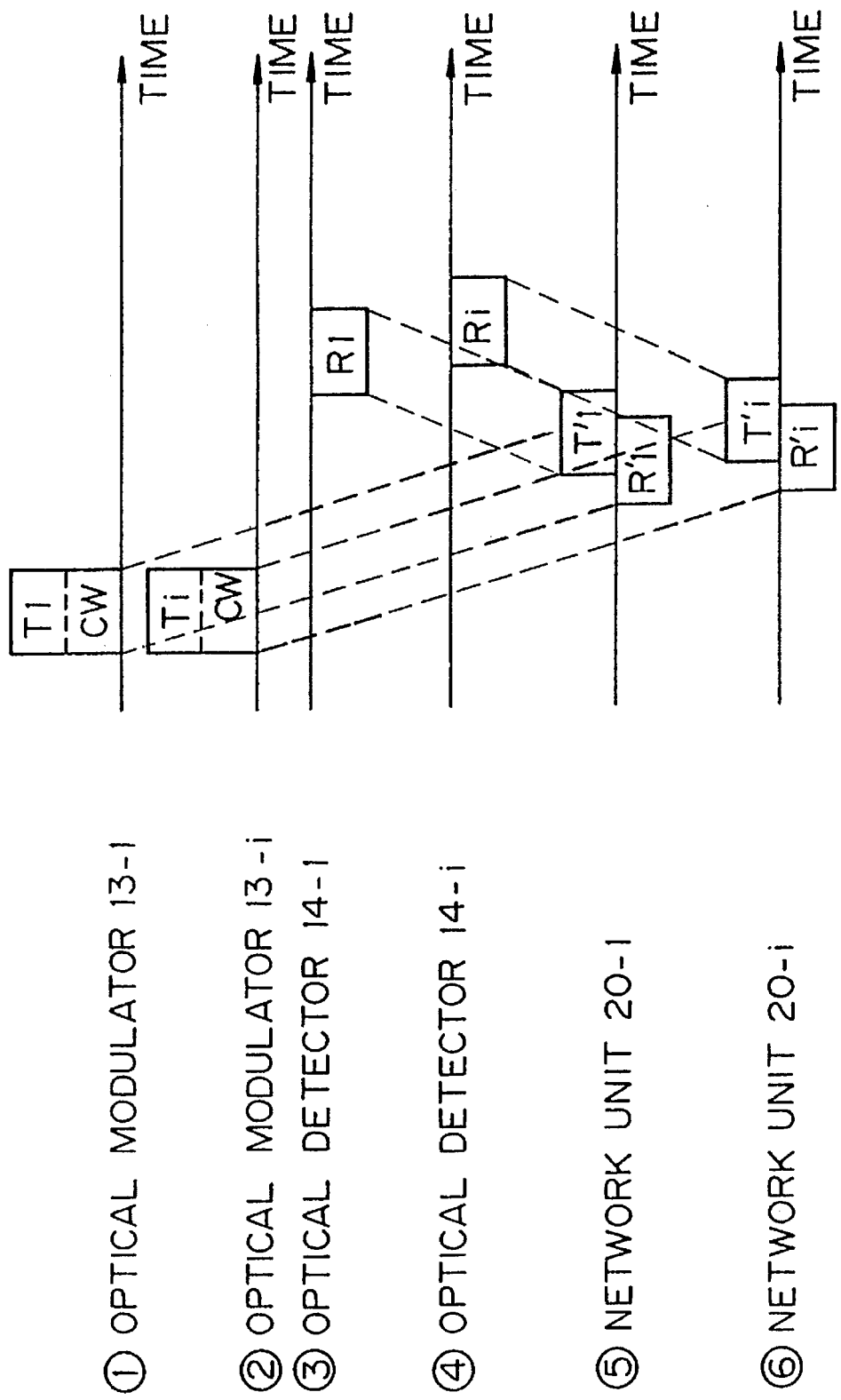
FIG. 7 shows operational time charts in the first embodiment, when modulated beam is imposed on non-modulated beam.

FIG. 7 shows an operational time chart of the present optical bidirectional transmission system, when a modulated signal is superposed with a non-modulated signal. In the figure, the charts (1) through (4) show the operation of an optical subscriber unit 10, the charts (5) and (6) show the operation of optical network units 20-1 and 20-i, respectively.

The chart (1) shows the operation of an optical modulator 13-1, where T1 is a modulated beam addressed to an optical network unit 20-1, and CW is a non-modulated beam superposed on the beam T1.

The chart (5) shows the operation of an optical network unit 20-1, where R'1 is a received signal obtained from the modulated beam T1, and T'1 is a modulated beam which is provided by modulating the non-modulated beam of the output of a limiter 27 with a transmission signal S'.

The chart (3) shows the operation of an optical detector 14-1, where R1 is a received signal obtained from the modulated beam T'1.

The chart (2) shows the operation of an optical modulator 13-i, the chart (6) shows the operation of an optical network unit 20-i, and the chart (4) shows the operation of an optical detector 14-i, and those are similar to the operation of the optical modulator 13-1, the optical network unit 20-1, and the optical detector 14-1.

The operation of FIG. 7 where a modulated beam and a non-modulated beam are superposed with each other has the advantage that the transmission time may be half as compared with the transmission time of FIG. 5 where a modulated beam and a non-modulated beam transmitted serially in time division multiplex basis, and therefore, the transmission efficiency is improved.

Figure 8:
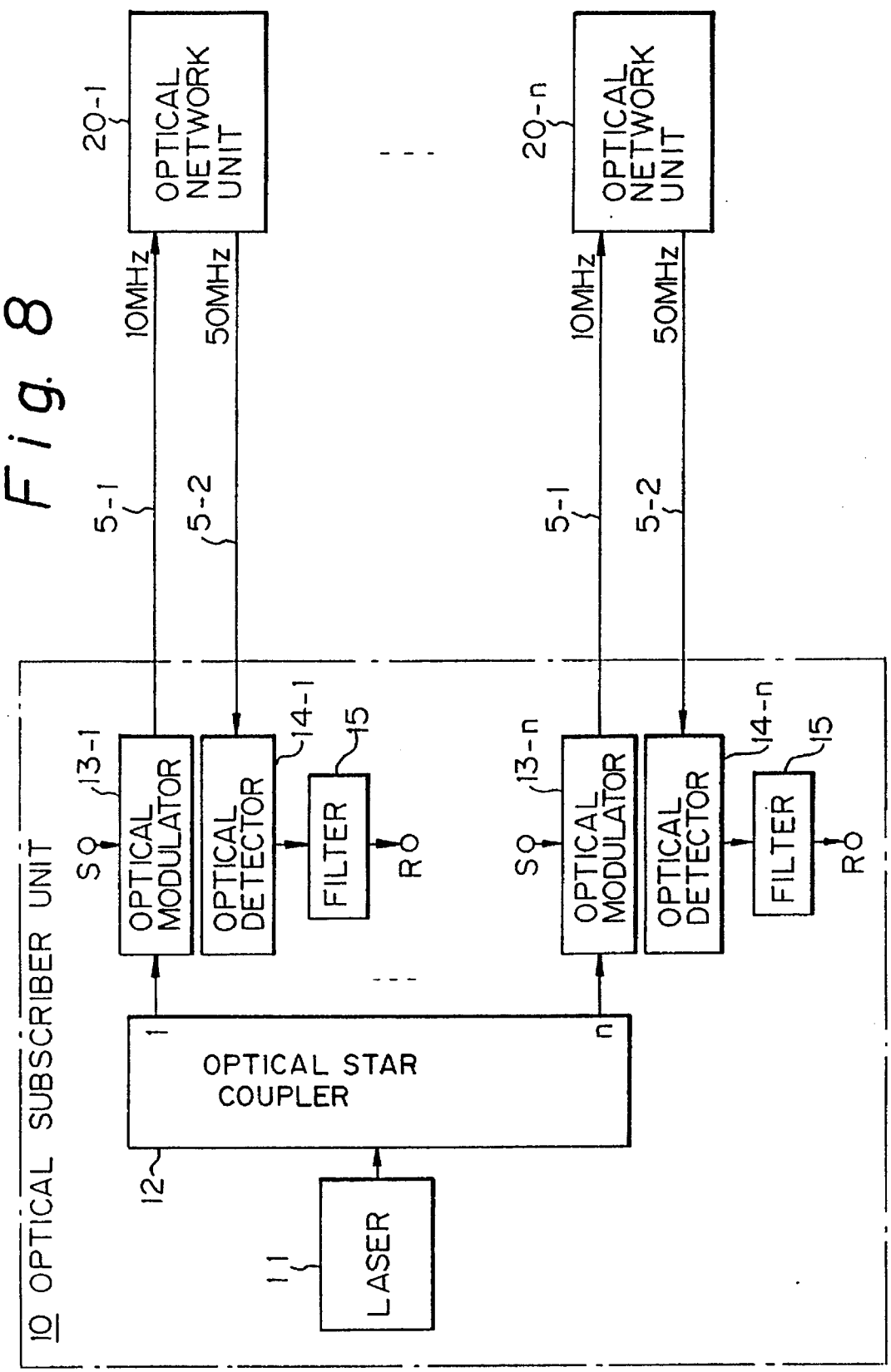
FIG. 8 shows a block diagram of a modification of FIG. 1, for forwarding analog signal.

When a transmission signal S is in analog form, carrier frequency from an optical subscriber unit 10 to an optical network unit 20 may differ from a carrier frequency from an optical network unit 20 to an optical subscriber unit 10. For instance, in the configuration of FIG. 8, an optical subscriber unit 10 transmits a modulation signal which has carrier frequency 10 MHz, and an optical network unit 20 transmits a modulation signal which has a carrier frequency 50 MHz. The structure of an optical network unit 20 in FIG. 8 may be any one of FIGS. 2A–2D. An optical subscriber unit 10 has a filter 15 at an output of an optical detector 14-1 so that a signal on the carrier frequency 50 MHz is taken. The modulation system for an analog signal may be either an amplitude modulation system, or a frequency modulation system.

Figure 25:
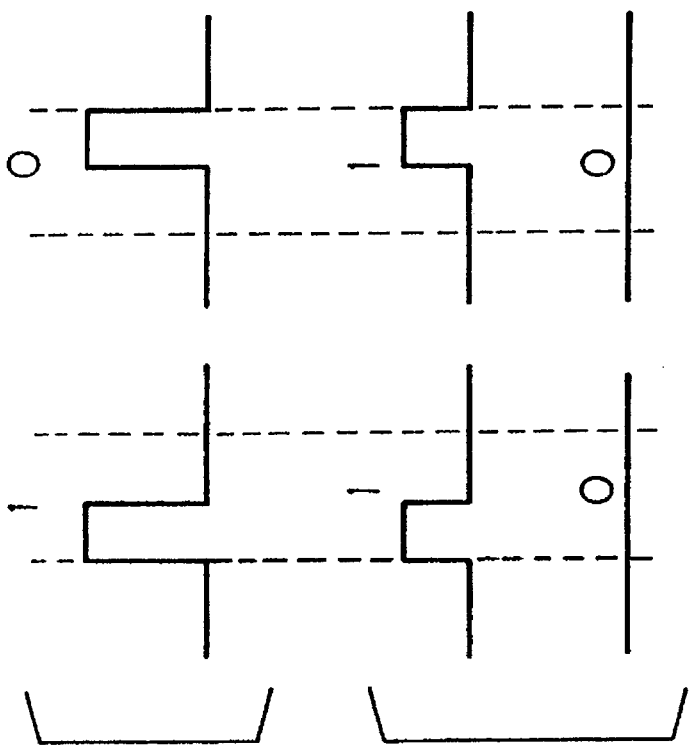
FIG. 25 shows some examples of signal configuration when phase modulation is used.

Further, the use of phase modulation as shown in FIG. 25 is possible. In that case, when an optical subscriber unit sends a beam to an optical network unit, phase modulation symbols are used. A phase modulation symbol is a bi-phase symbol in which a pair of pulses of positive-negative, and negative-positive pulses correspond to "1" and "0", respectively, or vice versa. When an optical network unit sends a beam to an optical subscriber unit, an RZ code in which a phase modulated signal is amplitude-modulated, is used.

(Second Embodiment)

FIG. 9 shows a block diagram of the second embodiment of the present invention.

The feature of FIG. 9 is the use of an (1×n) optical switch with one input and n outputs, instead of a star coupler (12 in FIG. 1). A laser oscillator 16 may be a small oscillator as compared with an oscillator 11 in FIG. 1, since an attenuation in an optical switch is considerably smaller as compared with that of a star coupler. The optical modulators 13-1 through 13-n must operate with a higher rate than that of FIG. 1, since the optical modulators 13-1 through 13-n must operate in time division multiplex basis.

FIG. 10 is a modification of FIG. 9, in which an optical switch 17 and the optical modulators 13-1 through 13-n are integrated.

FIG. 11 shows an operational time chart when a modulated beam and a non-modulated beam are transmitted serially in time division multiplex basis. A similar operation is possible when a modulation beam is transmitted simultaneously with a non-modulation beam.

In FIG. 11, the charts (1) through (6) show the operation of an optical subscriber unit 10, and the charts (7) and (8) show the operation of optical network units 20-1 and 20-i, respectively.

The chart (1) shows the operation of a laser 16, the chart (2) shows the switching operation of an optical switch 17.

The chart (3) shows the operation of an optical modulator 13-1, where T1 is a modulated beam addressed to an optical network unit 20-1, and CW is a non-modulated beam.

The chart (7) shows the operation of an optical network unit 20-1, where R'1 is a received signal obtained by a part of a modulated beam T1, and the rest of the modulated beam T1 is offset to the optical subscriber unit 10. The symbol T'1 is a modulated beam which is obtained by modulating a non-modulated beam with a transmission signal S'.

The chart (4) shows the operation of an optical detector 14-1, where T1 is the beam modulated in the subscriber unit 10 and is offset in the network unit. The beam T1 is disregarded in the optical subscriber unit 10. The symbol R1 is a received signal which is obtained by a modulated beam T'1.

The chart (5) shows the operation of an optical modulator 13-i in an optical subscriber unit 10, the chart (8) shows the operation of an optical network unit 20-i, and the chart 6 shows the operation of an optical detector 14-i, and the operation in those charts is similar to that of the optical modulator 13-1, the optical network unit 20-1, and the optical detector 14-1. The important feature in FIG. 11 as compared with that of FIG. 5 is that each optical modulator 13 (13-1 through 13-n) operates only at a time slot assigned by an optical switch 17.

The transmission of an analog signal in the second embodiment is now described.

Figure 12A:
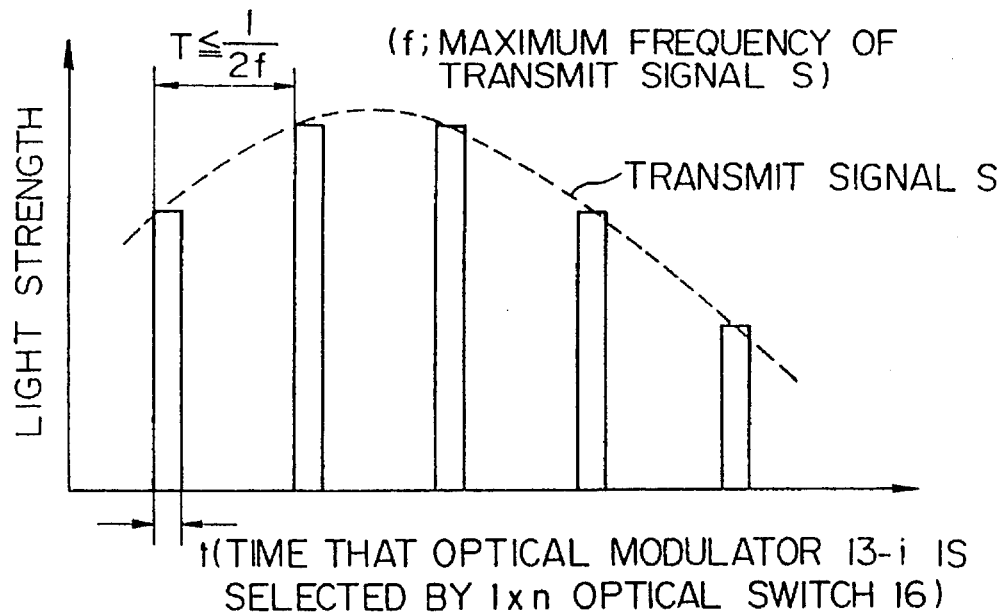
FIGS. 12A and 12B show an example of transmission of analog signal in the second embodiment.

In an optical subscriber unit 10, a non-modulated beam is applied to an optical modulator 13-i during the time t where the optical switch 17 assigns a time slot to the optical modulator 13-i, as shown in FIG. 12(A). The modulator 13-i modulates the non-modulated beam with the modulation frequency f kHz, and the modulated beam is transmitted to a respective optical network unit 20-i. It is supposed that the period T that the optical switch 17 assigns a time slot to each optical modulator is less than ½f, according to the sampling theorem.

Figure 12B:
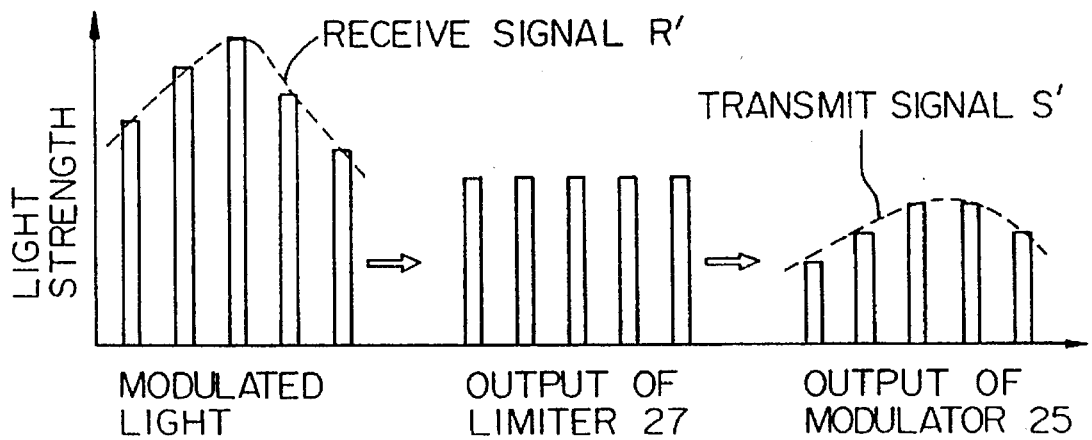

Each optical network unit 20 removes a modulated component in the modulated beam as shown in FIG. 12(B) by using a limiter 27 which receives the rest of the modulated beam from a 18 dB coupler 23 (FIG. 2). The non-modulated beam which is the output of the limiter 27 is modulated with a transmission signal S' in an optical modulator 25.

As described above, when an optical switch 17 is used instead of a star coupler, an optical beam from an optical network unit to an optical subscriber unit is intermittent like an optical beam from an optical subscriber unit to an optical network unit. Therefore, the operation rate of an optical modulator in an optical network unit 25 may be low. The intermitted signals from the optical network units are interpolated in an optical subscriber unit to provide a continuous signal.

(Third embodiment)

FIG. 13 shows a block diagram of the third embodiment of the present invention. The feature of the embodiment of FIG. 13 is the use of 2×2n optical switch 18, instead of a 1×n optical switch 17 in FIG. 9. The 2×2n optical switch has two ports in one side, and 2n ports in the other side. A common optical detector 14 is coupled with a port of the optical switch 18 so that it is selectively coupled with one of the optical network units 20-1 through 20-n, through the optical switch 18. The optical detector 14 detects received signal R of all the optical network units in time division multiplex basis. Other structure of the optical subscriber unit 10, and the structure of an optical network unit are the same as those in the previous embodiment.

FIG. 14 shows the modification of FIG. 13, and has a pair of 1×n optical switches 17-1 and 17-2, instead of one 2×2n optical switch 18. In case of FIG. 14, each optical switch operates for the transmit side and the receive side, respectively, and therefore, the timing control of the transmit side may be independent from that of the receive side.

FIG. 15 shows an operational timing chart in the third embodiment, when a modulated signal and a non-modulated signal are transmitted serially in time division multiplex basis. The similar operation is possible when a modulated signal is transmitted simultaneous with a non-modulated signal.

In the figure, the charts (1) through (5) show the operation of the optical subscriber unit 10, the charts (6) and (7) show the operation of the optical network units 20-1 and 20-i.

The chart (1) shows the operation of the laser oscillator 16.

The chart (3) shows the operation of the 2×2n optical switch 18, where 1*1 shows the connection of the laser 16 and the optical modulator 13-1, 1*i shows the connection of the laser 16 and the optical modulator 13-i, 2*2 shows the connection of the optical network unit 20-1 and the optical detector 14, 2*(i+1) shows the connection of the optical network unit 20-i and the optical detector 14. The similar operation is possible when a pair of optical switches 17-1 and 17-2 are used.

The chart (4) shows the operation of the optical modulator 13-1, where T1 is modulated beam addressed to the optical network unit 20-1, CW is non-modulated beam.

The chart (6) shows the operation of the optical network unit 20-1, where R'1 is received signal which is obtained by a part of the modulated beam T1, T'1 is a modulated beam which is obtained by modulating a non-modulated beam CW with the transmission signal S'.

The chart (2) shows the operation of the optical detector 14, where T1 is the offset beam which is offest by the optical network unit 20-1, and is disregarded. The symbol R1 is the received signal which is obtained from the modulated beam T'1.

The chart (5) shows the operation of the optical modulator 13-i in the optical subscriber unit 10, the chart (7) shows the operation of the optical network unit 20-i, and are similar to those of the optical modulator 13-1, and the optical network unit 20-1, respectively.

The feature of FIG. 15 as compared with FIG. 11 is that the optical detector 14 operates in time division multiplex basis.

In FIG. 15, the transmission to all the optical network units, and the reception from all the optical network units are carried out alternately.

Figure 16:
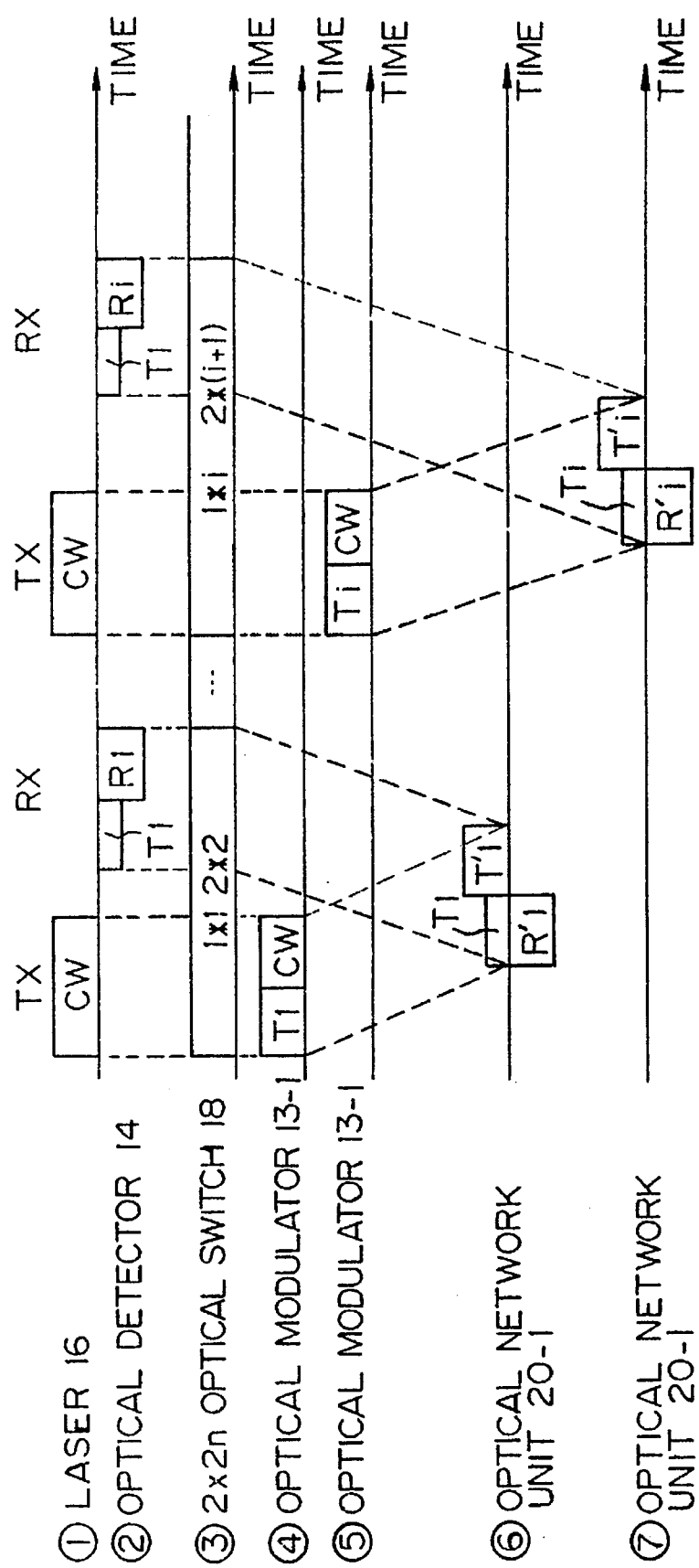
FIG. 16 shows another operational time chart in the third embodiment.

On the other hand, the transmission and the reception for each optical network unit are carried out for every optical network unit. FIG. 16 shows the operational time chart in the latter case. In FIG. 16, a 2×2n optical switch 18 is switched for each optical network unit, and other operations are the same as those in FIG. 15.

The structure in FIGS. 13 and 14 may be modified as shown in FIGS. 17(A) and 17(B), respectively, by integrating a 2×2n optical switch (or 1×n optical switch 17-1) with optical modulators 13-1 through 13-n.

(Fourth embodiment)

FIG. 26 shows a block diagram of a fourth embodiment of the present invention. The feature of FIG. 26 is the use of a 2×2n star coupler 31, instead of a 2×2n optical switch, and each optical network unit (20-1 through 20-n) has no optical source. In the optical subscriber unit 10, the laser oscillator 16 and the optical detector 14 are coupled with the 2×2n star coupler 31. Each optical network unit 20-1 through 20-n is coupled with the star coupler 31 through a pair of optical cables 5-1 and 5-2. An optical modulator (13-1 through 13-n) is provided for each optical network unit.

FIG. 27 shows the operational time chart in the fourth embodiment when a modulated beam and a non-modulated beam are transmitted serially. The similar operation is possible when a modulated beam and a non-modulated beam are transmitted simultaneously (FIGS. 6 and 7) if a modulation index is small.

In FIG. 27, the charts (1) through (4) show the operation of an optical subscriber unit 10, the charts (5) and (6) show the operation of optical network units 20-1 and 20-i, respectively.

The chart (1) shows the operation of a laser oscillator 16, in which a non-modulated beam CW is transmitted when an optical subscriber unit is in a transmit phase.

The chart (3) shows the operation of an optical modulator 13-1, where T1 is a modulated beam addressed to an optical network unit 20-1, and CW is a non-modulated beam. The duration of the non-modulated beam is the same as that of the modulated beam.

The chart (5) shows the operation of an optical network unit 20-1, where R'1 is a received signal obtained by a modulated beam T1, and T'1 is a modulated beam which is obtained by modulating a non-modulated beam with the transmission signal S'.

The chart (2) shows the operation of an optical detector 14, where R1 is a received signal obtained by a modulated beam T'1.

The chart (4) shows the operation of an optical modulator 13-i, the chart (6) shows the operation of an optical network unit 20-i, and those are similar to those of an optical modulator 13-1, and optical network unit 20-1.

FIG. 28 shows another operation in the fourth embodiment, where a modulated beam and a non-modulated beam are transmitted serially.

In the figure, the charts (1) through (6) show the operation of the same members of the same chart number as those in FIG. 27. The feature in FIG. 28 is that the duration of the non-modulated beam CW transmitted by an optical modulator in an optical subscriber unit extends to the whole duration of a transmit phase in the optical subscriber unit. That is advantageous in that an optical network unit may transmission a signal to an optical subscriber unit at any time irrespective of a transmit time from an optical subscriber unit, and therefore, the efficiency of receiving frames in an optical subscriber unit is improved.

In FIGS. 27 and 28, the rest of modulation beam taking in an optical network unit is not shown for the sake of simplicity of figures.

Figure 29A:
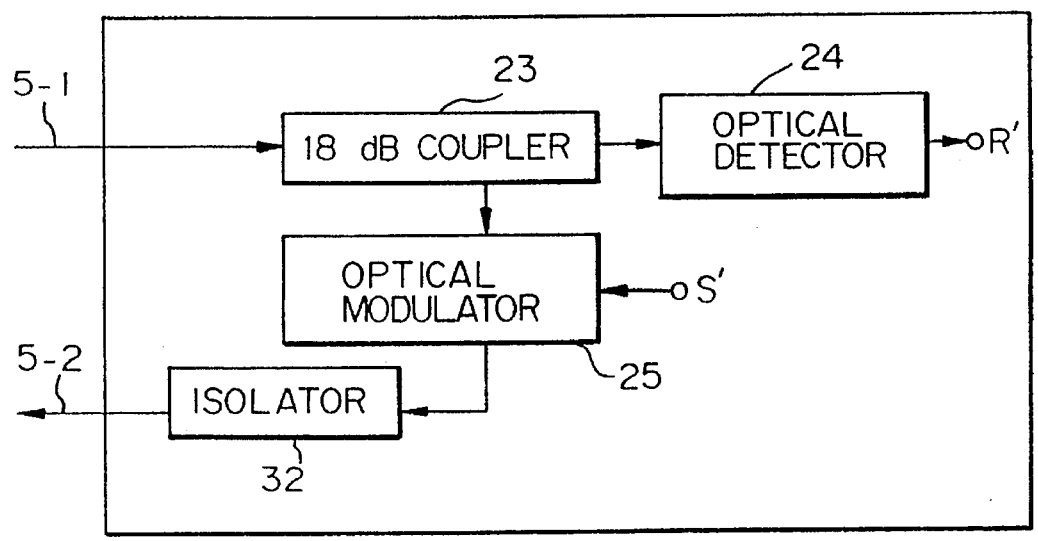
FIGS. 29A and 29B show some embodiments of an optical network unit in fourth embodiment.
Figure 29B:
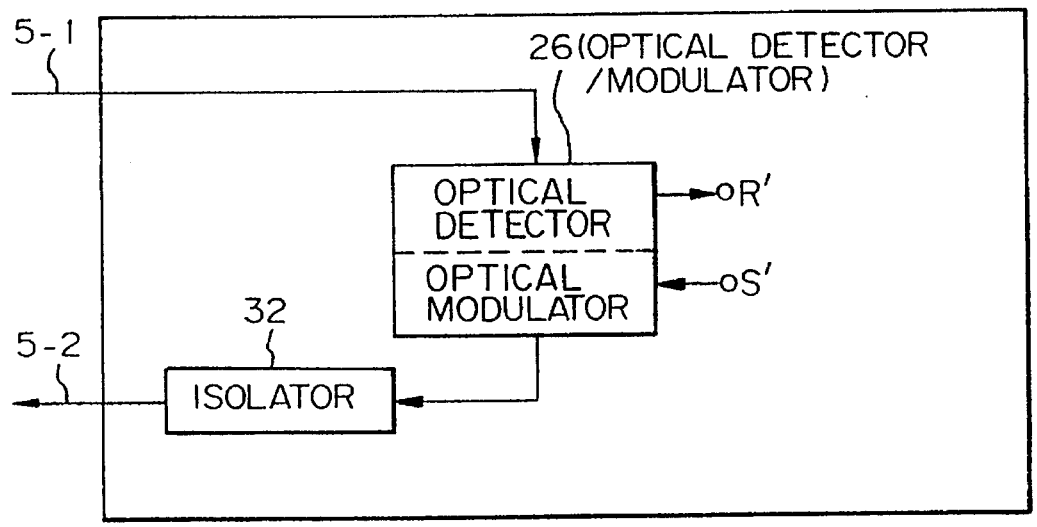
Figure 33:
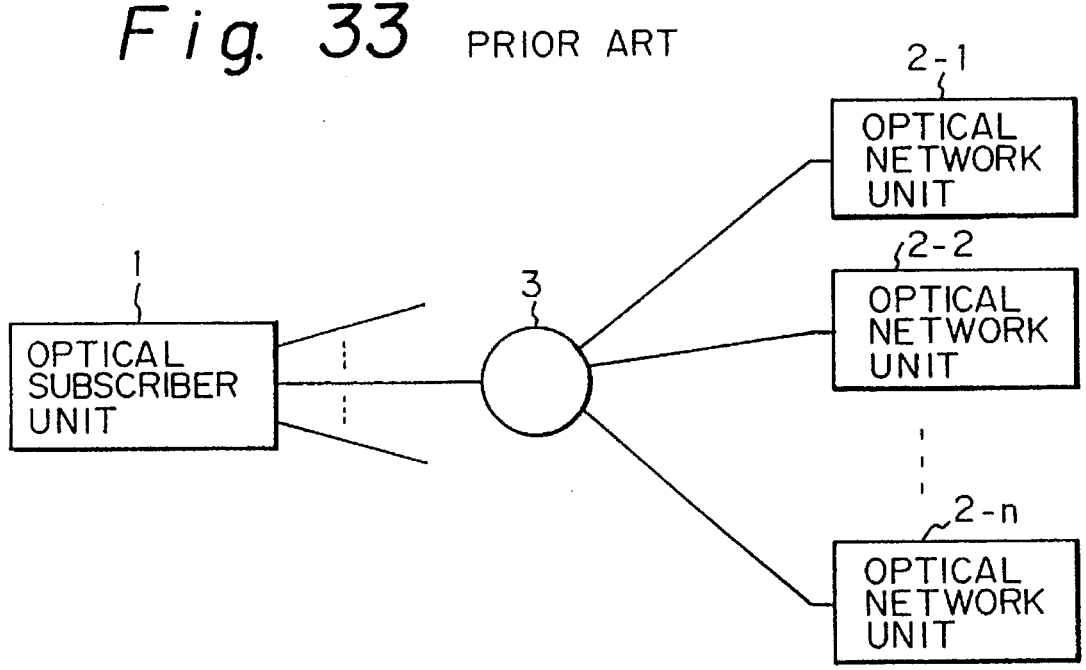
FIG. 33 shows a block diagram of a prior bidirectional optical transmission system.
Figure 34:
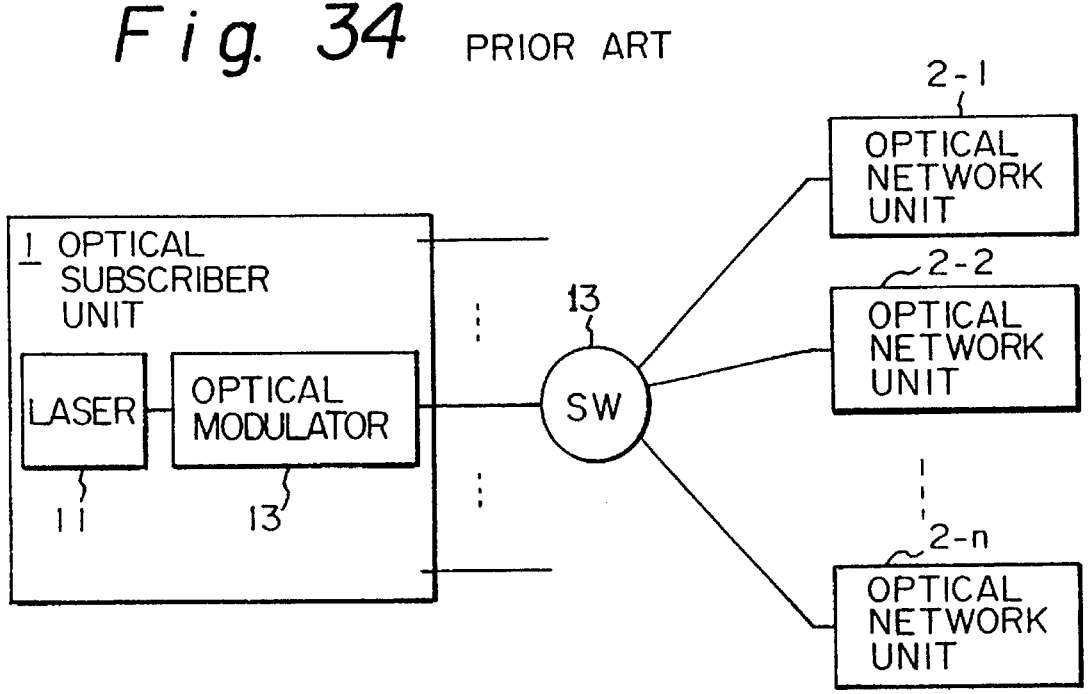
FIG. 34 shows a block diagram of another prior bidirectional optical transmission system.

FIGS. 29(A) and 29(B) show a block diagram of an optical network unit for the fourth embodiment. Those are similar to those in FIGS. 2(B) and 2(C), except an isolator 32 in a transmit side from an optical network unit.

When an optical subscriber unit forwards to an optical network unit a beam, the whole non-modulated beam CW transmitted by the optical subscriber unit is applied to an optical cable 5-2, and the non-modulated beam CW in the cable 5-2 may be undesirably applied to the optical network unit in an opposite direction. The isolator 32 prevents that undesired beam in the opposite direction.

FIG. 30 shows the modification of the fourth embodiment. In FIG. 30, a pair of star couplers 12-1 and 12-2 are used, instead of a single 2×2n star coupler 31 in FIG. 26, and no optical source is provided in an optical network unit. The configuration of FIG. 30 is advantageous in that the transmit timing may be independent from the receive timing, because of the presence of a pair of 1×n star couplers 12-1 and 12-2. Further, since a star coupler is provided in a transmit side and a receive side, separately, no CW beam in a opposite direction is applied to an optical network unit when an optical subscriber unit transmits a beam to an optical network unit, and therefore, no isolator as shown in FIG. 29 is required.

FIG. 31 shows an operational time chart for the modification of the fourth embodiment, when a modulated beam and a non-modulated beam are transmitted serially. When the modulated beam is superposed with the non-modulated beam with a small modulation index (FIGS. 6 and 7), the operation is similar.

In FIG. 31, the charts (1) through (5) show the operation in an optical subscriber unit 10, and the charts (6) through (8) show the operation in the optical network units 20-1, 20-2 and 20-n.

The chart (1) shows the operation of a laser oscillator 16, which transmits a non-modulated beam CW in the whole duration that the optical subscriber unit transmits beams.

The chart (3) shows the operation of an optical modulator 13-1, where T1 is a modulation beam directed to an optical network unit 20-1, and CW is a non-modulated beam. The length of the non-modulated beam CW is the same as the length of the modulated beam.

The chart (6) shows the operation of an optical network unit 20-1, where R'1 is a received signal obtained from the modulated beam T1, and T'1 is a modulated beam which modulates the non-modulated beam CW with a transmission signal S' from an optical network unit to an optical subscriber unit.

The chart (2) shows the operation of an optical detector 14, where R1 is a received signal obtained from the modulated beam T'1.

The charts (4) and (5) show the operation in the optical modulators 13-2 and 13-n, respectively, in an optical subscriber unit, and are similar to that of the optical modulator 13-1.

The charts (7) and (8) show the operation in the optical network units 20-2 and 20-n, respectively, and are similar to that of the optical network unit 20-1.

In the modification of the fourth embodiment, a pair of star couplers are used in a transmit side and a receive side, respectively, and therefore, there is no problem even if transmission signals might overlap with received signals.

An optical subscriber unit must control transmit timing to optical network units so that received signals from optical network units do not overlap with each other. One of the solution for that control is to provide guard time T between each transmission signal so that received signals R do not overlap with each other. The amount of the guard time T is for instance (1) the maximum delay time of bothway transmission for all the optical network units from an optical subscriber unit to the optical subscriber unit through an optical network unit, or (2) the delay time of bothway transmission for each optical network unit. In case of (1), the guard time T is common for all the optical network units, and therefore, the control is carried out simply, and in case of (2), the guard time depends upon each optical network unit, and the control is complicated, but the transmission efficiency is improved.

FIG. 32 shows an operational time chart in the modification of the fourth embodiment when the modulated beam and the non-modulated beam are transmitted serially. The charts (1) through (8) are similar to those in FIG. 31, except that the non-modulated beam CW transmitted by an optical subscriber unit extends to the whole transmit time. Therefore, an optical network unit may transmit the modulated beam to an optical subscriber unit at any time irrespective of the transmit timing of an optical subscriber unit. Thus, a guard time between each transmit beams in an optical subscriber unit may be short, so that transmission efficiency is improved.

(Fifth embodiment)

FIG. 18 shows a block diagram of the fifth embodiment of the present invention. In the figure, a single single-mode optical fiber cable 5 couples an optical subscriber unit 10 with each of the optical network units 20-1 through 20-n. The optical subscriber unit 10 has a laser oscillator 11, an optical star coupler 12 which is coupled with the output of the laser oscillator 11 so that n number of split laser beams are obtained, n number of optical modulators 13-1 through 13-n relating to each of the optical network units, coupled with outputs of the star coupler 12, n number of optical detectors 14-1 through 14-n relating to each of the optical network units, and n number of optical couplers 19-1 through 19-n relating to each of the optical network units, so that an optical modulator and an optical detector are coupled with a single mode optical fiber cable 5. A power supply circuit and a control circuit are not shown in FIG. 18 for the sake of simplicity.

The optical subscriber unit 10 in FIG. 18 has the feature of the presence of an optical coupler (19-1 through 19-n) which multiplexes and/or de-multiplexes a transmit beam and a received beam to/from each optical network unit 20. Other configurations are similar to those in the first embodiment.

When the modulated beam and the non-modulated beam are transmitted serially, the operation is similar to that of FIG. 5, and when the modulated beam is imposed on the non-modulated beam, the operation is similar to that of FIG. 7.

It should be appreciated that a star coupler 12 may be substituted with an optical switch as is the case of the second embodiment and the third embodiment. In that case, output power of a laser oscillator may be smaller.

FIG. 19 shows some embodiments of an optical network unit in the fourth embodiment.

Figure 19A:
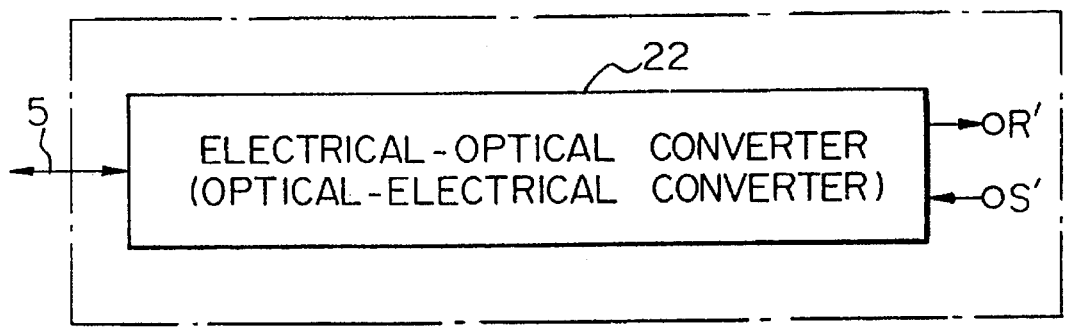
FIGS. 19A–19C show some examples of an optical network unit in the fifth embodiment.

FIG. 19(A) shows the case that an electrical-optical converter 22 doubles as an optical-electrical converter. An optical signal received in the optical cable 5 is converted into an electrical signal R' by the optical-electrical converter 22. Similarly, a transmission signal S' to an optical subscriber unit 10 is converted into an optical signal in the electrical-optical converter 22, so that the converted optical beam is applied to the optical cable 5.

Figure 19B:
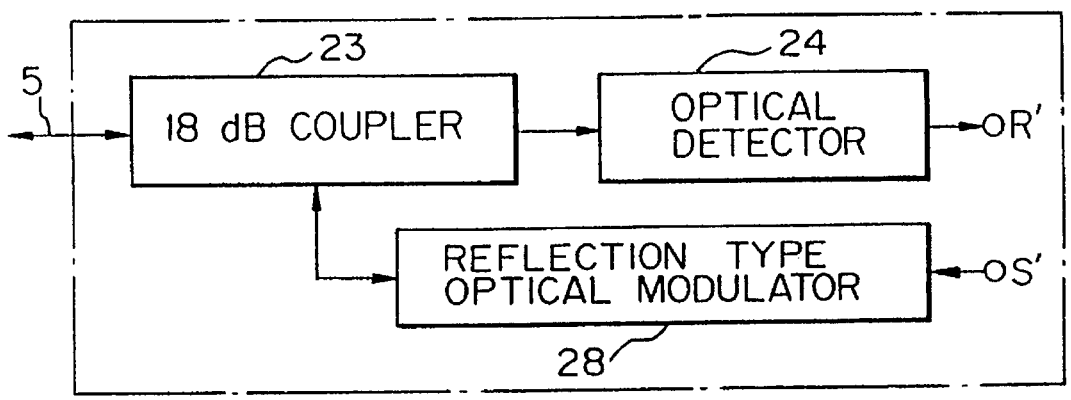
Figure 19C:
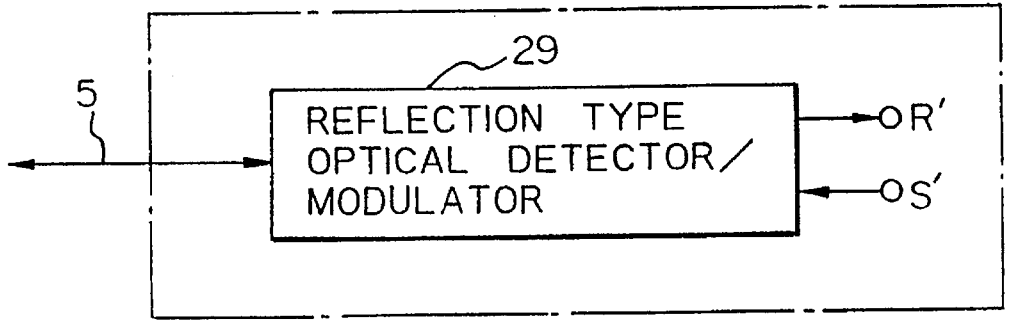

When a modulated beam and a non-modulated beam from an optical subscriber unit 10 are transmitted serially, an optical network unit may have the structures as shown in FIG. 19(B) or FIG. 19(C), which corresponds to the structures of FIG. 2(B) and FIG. 2(C), respectively.

In FIG. 19(B), an optical detector 24 and a reflection type optical modulator 28 are coupled with a 18 dB coupler which is coupled with an optical cable 5. A received optical beam through the optical cable 5 is partly applied to the optical detector 24 through the 18 dB coupler 23 so that the received signal R' is obtained from the modulated optical beam. The rest of the optical beam is applied to the reflection type optical modulator 28 which modulates the non-modulated portion of the received beam with the transmission signal S'.

In FIG. 19(C), an integrated optical detector/modulator 29 is shown. A received beam from the optical cable 5 is received by the detector/modulator 29 which provides the received signal R'. Simultaneously, the non-modulated beam is modulated with a transmission signal S', and the modulated beam is transmitted to the optical subscriber unit through the optical cable 5.

Figure 20:
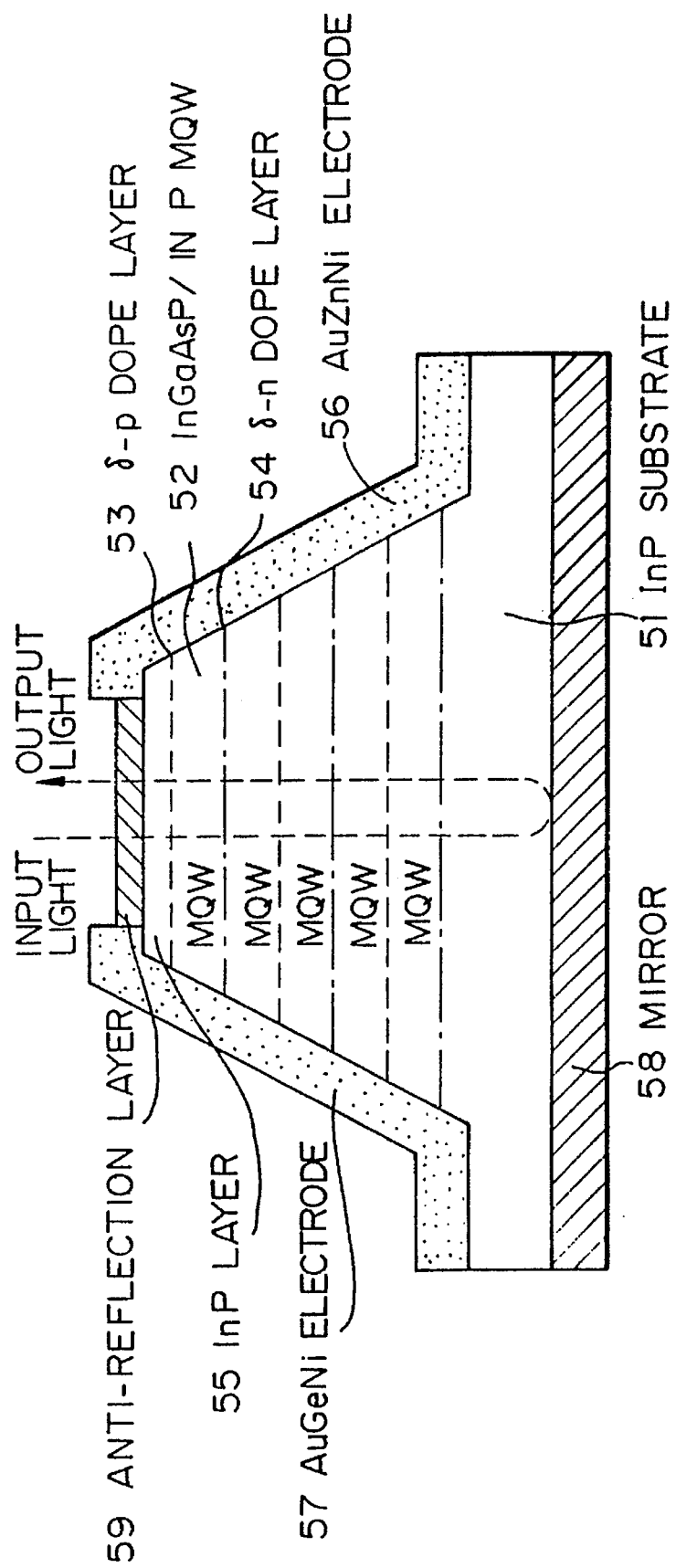
FIG. 20 shows structure of an optical modulator, and an optical modulator/detector.

FIG. 20 shows the structure of a reflection type optical modulator 28, and a reflection type optical detector/modulator 29.

In the figure, the numeral 51 is an undoped InP substrate, on which InGaAsP/InP multiple quantum well layer (MQW) 52, on which an undoped InP layer 55 is deposited. The MQW layer 52 is laminated alternately with δ-p doped layer 53 (a dotted line in the figure) which is a doped like sheet, and δ-n doped layer 54 (a dashed line in the figure). The InGaAsP/InP multiple quantum well layer 52 is mesa-etched in circular shape with diameter 8 μm, and on a part of mesa sides, a p-electrode 56 of AuZnNi, and an n-electrode 57 of AuGeNi are attached. Also, a mirror 58 is provided on rear surface of the substrate 51 through evaporation of Au. An anti-reflection layer 59 is provided on an input/output plane of an optical beam. The δ-dope is used so that leak current between a p-electrode and an n-doped layer, and leak current between an n-electrode and a p-electrode are prevented.

Figure 21:
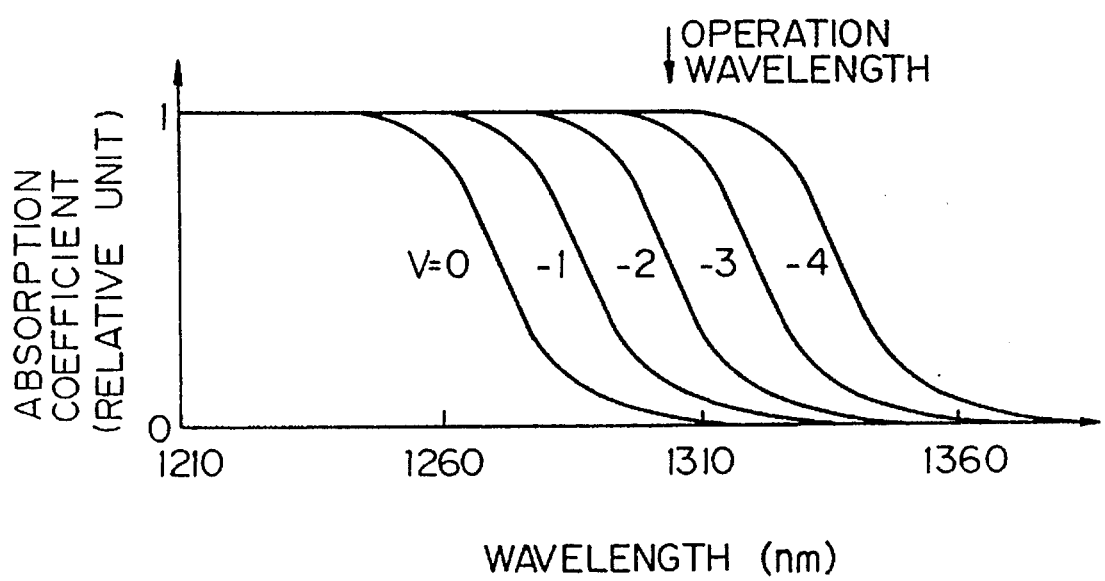
FIG. 21 shows curves of absorption coefficient of an optical modulator and an optical modulator/detector of FIG. 20, FIGS. 22A and 22B show modification of an optical network unit.

FIG. 21 shows curves of absorption spectrum in a reflection type optical modulator 28, and in a reflection type optical detector/modulator 29, in which the horizontal axis shows wavelength in (nm), the vertical axis shows absorption coefficient, and parameter (V) is reverse bias potential.

In the figure, it should be noted that the maximum wavelength with absorption shifts toward a longer wavelength depending upon reverse bias potential. Assuming that the wavelength in operation is 1310 nm, the reverse bias potential is controlled in the range of 0 V and −4 V according to transmission signal S', so that the absorption coefficient is controlled by the reverse potential, and the modulated beam is obtained. The ON/OFF ratio is approximate 20 dB.

A multiple quantum well of one period is not enough for providing enough ON/OFF ratio, since it is too thin to absorb the whole beam. A thick multiple quantum well is not enough for overcoming this problem, since a depletion layer does not extend to the whole multiple quantum well when potential is applied for modulation or absorption. In order to solve this problem, the present invention takes the laminated multiple quantum well structure sandwiched by a δ-p doped layer and δ-n doped layer so that reverse bias potential is applied to each of the multiple quantum well layers to provide excellent ON/OFF ratio.

When it is used as an optical detector, reverse bias potential is selected −4 V, so that a modulated beam is always absorbed in the operational wavelength. The optical detection sensitivity in that case is excellent, since the multiple quantum well layers for absorption is thick enough.

The operation of a reflection type optical modulator 28, and a reflection type optical detector/modulator 29 is as follows.

The non-modulated beam from an optical subscriber unit is applied to a modulation/absorption layer which is the lamination of multiple quantum well layers through an anti-reflection layer 59. The presence of the anti-reflection layer 59 improves the coupling efficiency to the modulation/absorption layer. The field distribution of an optical energy of the present element is similar to that of an optical fiber, but differs from that of a prior waveguide type device, the coupling efficiency between the present element and an optical fiber is very high, and is almost 90%. The optical energy coupled with the modulation/absorption layer is reflected by an mirror 58, and is applied again to the anti-reflection layer 59 through the modulation/absorption layer. When the beam passes the modulation/absorption layer, the beam is modulated through the control of the absorption efficiency depending upon the modulation signal (transmission signal S'), which is applied to the element. The modulated beam is transmitted to an optical subscriber unit through an optical cable 5.

When the optical beam from an optical subscriber unit is received, the receive received beam is coupled with a modulation/absorption layer through an anti-reflection layer 59. The beam coupled with the modulation/absorption layer is reflected by an mirror 58, and again passes through the modulation/absorption layer. When the beam passes through the modulation/absorption layer, the beam is absorbed in that layer, and is converted to an electrical signal. It is preferable to apply reverse bias potential to the present element so that the absorption coefficient at the operational wavelength is improved.

The use of the present element allows a single element to operate for both transmission and reception. Further, the power consumption is small as compared with a semiconductor laser, as the element is driven by voltage. Further, no power supply circuit is necessary. Further, the element is less dependent upon ambient temperature, and therefore, an excellent transmit and/or receive operation is possible.

As a modification, the optical modulator 26 in FIG. 2(C) may be substituted with a combination of a reflection type optical detector/modulator 29 and an optical coupler 30, as shown in FIG. 22(A). Further, an optical detector/modulator 29 in FIG. 19(C) may be substituted with a combination of an optical detector/modulator 26 and an optical coupler 30 as shown in FIG. 22(B).

Further, an optical coupler 19 in FIG. 19, and an optical coupler 30 in FIG. 22 may be substituted with an optical circulator, which has less optical attenuation.

As mentioned above in detail, the present invention provides the reduction of cost of an optical subscriber unit and an optical network unit, so that a bidirectional optical transmission system is provided with low cost.

From the foregoing it will now be apparent that a new and improved optical bidirectional transmission system has been found. It should be appreciated of course that the embodiments disclosed are merely illustrative and are not intended to limit the scope of the invention. Reference should be made to the appended claims, therefore, rather than the specification, for indicating the scope of the invention.

What is claimed is:

1. A bidirectional optical transmission system comprising:

an optical subscriber unit in a central office; and a plurality of optical network units in customer premises each coupled with said subscriber unit through at least one optical transmission line, said optical subscriber unit including a laser oscillator which provides one wavelength, splitting means, coupled with said laser oscillator, for splitting an output beam of said laser oscillator into a plurality of beams, a plurality of optical modulators each coupled with each beam split by said splitting means, each optical modulator for modulating said beam with a transmission signal for a respective optical network unit, an output of each said optical modulator being coupled with a respective optical network unit through said at least one optical transmission line, and optical detection means coupled with said respective optical network unit through said at least one optical transmission line, said optical detection means for providing a received signal from said respective optical network unit by converting an optical beam into electrical form; and each optical network unit including optical-electrical conversion means, coupled with said optical subscriber unit through said at least one optical transmission line, for providing a received signal by converting said optical beam from a respective optical modulator in said subscriber unit into electrical form, and electrical-optical conversion means, coupled with said optical subscriber unit through said at least one optical transmission line, for modulating a beam which is sent from said optical subscriber unit with a transmission signal and for sending the modulated beam to said optical subscriber unit.

2. A bidirectional optical transmission system according to claim 1, wherein each of said optical modulators provided in said optical subscriber unit operates with operation rate which is a same as operation rate of an optical network unit coupled with said optical modulator.

3. A bidirectional optical transmission system according to claim 1, wherein said beam splitting means is a star coupler, and said optical detection means comprises a plurality of optical detectors relating to each optical network unit.

4. A bidirectional optical transmission system according to claim 1, wherein said beam splitting means is an optical switch, and said optical detection means comprises a plurality of optical detectors relating to each optical network unit.

5. A bidirectional optical transmission system according to claim 1, wherein said optical beam splitting means is an optical switch, and said optical detection means is a single optical detector coupled with said optical switch.

6. A bidirectional optical transmission system according to claim 1, wherein said optical beam splitting means comprises a pair of optical switches each relating to transmission and reception, respectively, and said optical detection means is a single optical detector coupled with one of said optical switches.

7. A bidirectional optical transmission system according to claim 1, wherein said beam splitting means is a star coupler, and said optical detection means is a single optical detector coupled with said star coupler.

8. A bidirectional optical transmission system according to claim 1, wherein said optical beam splitting means comprises a pair of star couplers each relating to transmission and reception, respectively, and said single optical detector is coupled with the star coupler for reception.

9. A bidirectional optical transmission system according to claim 1, wherein said optical subscriber unit sends a modulated beam and a non-modulated beam serially in time division multiplex basis to each optical network units, and each optical network unit divides a received beam into first and second portions, said first portion being used to take a received signal from said optical subscriber unit, and said non-modulated beam in said second portion being used to send said optical subscriber unit a modulated beam which is obtained by modulating said non-modulated beam with said transmission signal.

10. A bidirectional optical transmission system according to claim 1, wherein said optical subscriber unit sends said optical network units a modulated beam and a non-modulated beam serially in time division multiplex basis, said optical network unit has an integrated means of an optical-electrical conversion portion and an electrical-optical conversion portion, the integrated means of the optical-electrical conversion portion provides a received signal and the electrical-optical conversion portion provides a transmission signal by modulating a beam which transmits the modulated beam with the transmission signal.

11. A bidirectional optical transmission system according to claim 1, wherein said optical subscriber unit sends a modulated beam imposing on a non-modulated beam to each of the optical network units, and each of said optical network units sends a modulated beam by modulating said non-modulated beam from the optical subscriber unit with the transmission signal.

12. A bidirectional optical transmission system according to claim 1, wherein an optical subscriber unit sends an optical network unit a signal in analog form by modulating a beam which is applied intermittently with an amplitude-modulation system.

13. A bidirectional optical transmission system according to one of claims 1–6, wherein each optical network unit is coupled with an optical subscriber unit through a single optical fiber.

14. A bidirectional optical transmission system according to claim 13, wherein an optical subscriber unit sends a modulated beam and a non-modulated beam serially in time division multiplex basis, and an optical network unit separates said beams by using a beam splitting means which provides two outputs, the first output of said beam splitting means is applied to an optical detector to provide a received signal, and the second output of said beam splitting means is applied to a reflection type optical modulator for providing a beam modulated with the transmission signal.

15. A bidirectional optical transmission system according to claim 13, wherein an optical subscriber unit sends a modulated beam and a non-modulated beam serially in time division multiplex basis to an optical network unit which has a reflection type optical detector/modulator for detection of a received signal and modulation of the transmission signal.

16. A bidirectional optical transmission system according to claim 1, wherein an optical network unit has a plane type modulator in which an input beam and an output beam are applied to a plane of layers of the modulator almost perpendicularly.

17. A bidirectional optical transmission system according to claim 16, wherein said modulator has a plurality of δ-doped layers.

* * * * *